(12) United States Patent
Wang et al.

(10) Patent No.: US 9,206,370 B2
(45) Date of Patent: *Dec. 8, 2015

(54) LUBRICANT BASE STOCKS FROM RENEWABLE SOURCES WITH IMPROVED LOW TEMPERATURE PROPERTIES

(71) Applicant: ExxonMobil Research and Engineering Company, Annandale, NJ (US)

(72) Inventors: Kun Wang, Bridgewater, NJ (US); Kristen Amanda Lyon, West Deptford, NJ (US); Eugenio Sanchez, Pitman, NJ (US); Charles Lambert Baker, Jr., Thornton, PA (US); Beatrice Marie Gooding, Hopewell, NJ (US); Frank Cheng-Yu Wang, Annandale, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 401 days.
This patent is subject to a terminal disclaimer.

(21) Appl. No.: 13/717,783

(22) Filed: Dec. 18, 2012

(65) Prior Publication Data
US 2013/0190544 A1   Jul. 25, 2013

Related U.S. Application Data

(63) Continuation-in-part of application No. 12/660,815, filed on Mar. 4, 2010, now Pat. No. 8,957,266.

(60) Provisional application No. 61/210,045, filed on Mar. 13, 2009.

(51) Int. Cl.
*C10M 105/02* (2006.01)
*C10M 105/04* (2006.01)
(Continued)

(52) U.S. Cl.
CPC ........... *C10M 105/06* (2013.01); *C10M 105/04* (2013.01); *C10M 109/02* (2013.01);
(Continued)

(58) Field of Classification Search
CPC .................. C10M 2203/045; C10M 2203/04; C10M 2203/0206; C10M 2203/1065
USPC ............................................. 585/20, 21, 240
See application file for complete search history.

(56) References Cited

U.S. PATENT DOCUMENTS

| 4,303,590 A | 12/1981 | Tanaka et al. |
| 5,354,878 A | 10/1994 | Connemann et al. |

(Continued)

FOREIGN PATENT DOCUMENTS

| JP | 51031241 | 12/1965 |
| JP | 76031241 | 9/1976 |
| WO | 2007068800 | 6/2007 |

OTHER PUBLICATIONS

R.M. Koster, M. Bogert, B. de Leeuw, E.K. Poels, A. Bliek, "Active sites in the clay catalysed dimerisation of oleic acid", J. of Molecular Catalysis A: Chemical, 134, 1998, pp. 159-169.

(Continued)

*Primary Examiner* — Ellen McAvoy
(74) *Attorney, Agent, or Firm* — Robert A. Migliorini

(57) ABSTRACT

Provided are lube base stocks produced from renewable biological sources with improved low temperature properties. In one form, the lube base stock includes from 10 to 35 wt. % paraffins, 40 to 70 wt. % 1-ring naphthenes, and 0 to 40 wt. % combined 2-ring naphthenes and aromatics, and has a ratio of 1-ring naphthenes to paraffins from 1.8 to 5.0, and a Viscosity Index of from 100 to 160. The lube base stock has a $^{14}C$ level ranging from 2 to 101% of the modern day $^{14}C$ level in the atmosphere, and yields a CCS ratio (Cold Crank Simulator (CCS) viscosity to the predicted CCS viscosity by Walther equation) of less than or equal to 0.85 at $-35°$ C. The base stocks are useful as in formulated lubricant compositions requiring improved low temperature properties.

41 Claims, 13 Drawing Sheets

(51) Int. Cl.
   *C10M 105/06*   (2006.01)
   *C10M 177/00*   (2006.01)
   *C10M 109/02*   (2006.01)

(52) U.S. Cl.
   CPC ..... *C10M177/00* (2013.01); *C10G 2300/1011* (2013.01); *C10G 2400/10* (2013.01); *C10M 2203/022* (2013.01); *C10M 2203/0206* (2013.01); *C10M 2203/045* (2013.01); *C10N 2220/021* (2013.01); *C10N 2220/022* (2013.01); *C10N 2220/023* (2013.01); *C10N 2230/02* (2013.01); *C10N 2230/74* (2013.01); *C10N 2260/02* (2013.01); *C10N 2270/00* (2013.01)

(56) References Cited

U.S. PATENT DOCUMENTS

| | | | |
|---|---|---|---|
| 5,525,126 | A | 6/1996 | Basu et al. |
| 5,644,129 | A * | 7/1997 | Hsu et al. .................. 250/282 |
| 7,816,570 | B2 * | 10/2010 | Roberts et al. ............. 585/240 |
| 7,888,542 | B2 * | 2/2011 | Koivusalmi et al. ......... 585/327 |
| 8,053,614 | B2 * | 11/2011 | Aalto et al. .................... 585/1 |
| 8,324,438 | B2 * | 12/2012 | Brandvold et al. ........... 585/240 |
| 8,329,967 | B2 * | 12/2012 | Brandvold et al. ........... 585/240 |
| 8,329,968 | B2 * | 12/2012 | Brandvold et al. ........... 585/240 |
| 8,957,266 | B2 * | 2/2015 | Wang et al. .................. 585/254 |
| 2002/0010359 | A1 | 1/2002 | Kaita et al. |
| 2003/0149289 | A1 | 8/2003 | Suppes |
| 2007/0131579 | A1 | 6/2007 | Koivusalmi et al. |
| 2013/0144094 | A1 * | 6/2013 | Pansare et al. ................. 585/26 |

OTHER PUBLICATIONS

M.J.A.M. den Otter, "The Dimerization of Oleic Acid with Montmorillonite Catalyst I: Important Process Parameters: Some Main Reactions", Fette, Soften, Anstrichmittel, 1972, 667-673.

H.W.G. Heynen, W.H.M.J. van Opstal and M.J.A.M. den Otter, "The Catalyst Dimerization of Oleic Acid in a Continuous Flow Reactor", Fette, Seifen, Anstrichmittel, 1972, 677-681.

P. Tolvanen, P. Maki-Arvela, N. Kumar, K. Eranen, R. Sjoholm, J. Hemming, B. Holmbom, T. Salmi and D.Y. Murzin, "Thermal and Catalytic Oligomerization of Fatty Acids", Applied Catalysis A: General, 2007, 330, 1-11.

M. Snare, I. Kubickova, P. Maki-Arvela, K. Eranen and D.Y. Murzin, "Heterogeneous Catalytic Deoxygenation of Stearic Acid for Production of Biodiesel", Ind. Eng. Chem. Res., 2006, 45, 5708-5715.

* cited by examiner

LUBRICANT BASE STOCKS FROM RENEWABLE SOURCES WITH IMPROVED LOW TEMPERATURE PROPERTIES

CROSS-REFERENCE TO RELATED APPLICATIONS

This is a Continuation-In-Part Application which claims priority to Non-Provisional U.S. Ser. No. 12/660,815 filed on Mar. 4, 2010, which claims priority to Provisional application U.S. Ser. No. 61/210,045 filed on Mar. 13, 2009, both of which are herein incorporated by reference in their entirety.

FIELD

The present disclosure relates to lubricant base stocks with superior low temperature properties produced from renewable biological sources.

BACKGROUND

Base stocks are commonly used for the production of lubricants, such as lubricating oils for automotives, industrial lubricants and lubricating greases. A base oil is defined as a combination of two or more base stocks used to make a lubricant composition. They are also used as process oils, white oils, metal working oils and heat transfer fluids. Finished lubricants consist of two general components, lubricating base stock and additives. Lubricating base stock is the major constituent in these finished lubricants and contributes significantly to the properties of the finished lubricant. In general, a few lubricating base stocks are used to manufacture a wide variety of finished lubricants by varying the mixtures of individual lubricating base stocks and individual additives.

According to the American Petroleum Institute (API) classifications, base stocks are categorized in five groups based on their saturated hydrocarbon content, sulfur level, and viscosity index (Table 1). Lube base stocks are typically produced in large scale from non-renewable petroleum sources. Group I, II, and III base stocks are all derived from crude oil via extensive processing, such as solvent extraction, solvent or catalytic dewaxing, and hydroisomerization. Group III base stocks can also be produced from synthetic hydrocarbon liquids obtained from natural gas, coal or other fossil resources. Group IV base stocks, the polyalphaolefins (PAO), are produced by oligomerization of alpha olefins, such as 1-decene. Group V base stocks include everything that does not belong to Groups I-IV, such as naphthenics, polyalkylene glycols (PAG), and esters.

TABLE 1

| API classification | Group I | Group II | Group III | Group IV | Group V |
|---|---|---|---|---|---|
| % Saturates | <90 | ≥90 | ≥90 | Polyalpha-olefins (PAO) | All others not belonging to group I-IV |
| % S | >0.03 | ≤0.03 | ≤0.03 | | |
| Viscosity Index (VI) | 80-120 | 80-120 | ≥120 | | |

The automotive industry has been using lubricants and thus base stocks with improved technical properties for a long time. Increasingly, the specifications for finished lubricants require products with excellent low temperature properties, high oxidation stability and low volatility. Generally lubricating base stocks are base stocks having kinematic viscosity of about 3 cSt or greater at 100° C. (Kv100); pour point (PP) of about −12° C. or less; and viscosity index (VI) about 90 or greater. In general, high performance lubricating base stocks should have a Noack volatility no greater than current conventional Group I or Group II light neutral oils. Currently, only a small fraction of the base stocks manufactured today are able to meet these demanding specifications.

For environmental, economical, and regulatory reasons, it is of interest to produce fuels, chemicals, and lube oils from renewable sources of biological origin. So far only esters of renewable and biological origin have been used in applications such as refrigeration compressor lubricants, bio-hydraulic oils and metal working oils. In automotive and industrial lubricants, esters from biological sources are used in very small fractions as additives due to technical problems as well as their high prices. For example, ester base stocks can hydrolyze readily producing acids, which in turn cause corrosion on lubricating systems.

In contrast, base stocks consisting of hydrocarbons from biological sources do not have those technical problems associated with esters from the same sources. Most common biological sources for hydrocarbons are natural oils, which can be derived from plant sources such as canola oil, castor oil, sunflower seed oil, rapeseed oil, peanut oil, soy bean oil, and tall oil, or derived from animal fats. The basic structural unit of natural oils and fats is a triglyceride, which is an ester of glycerol with three fatty acid molecules having the structure below:

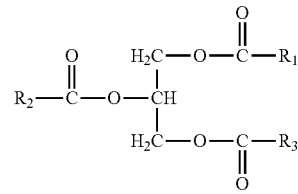

wherein $R_1$, $R_2$, and $R_3$ represent $C_4$-$C_{30}$ hydrocarbon chains. Fatty acids are carboxylic acids containing long linear hydrocarbon chains. Lengths of the hydrocarbon chains most commonly are 18 carbons ($C_{18}$). $C_{18}$ fatty acids are typically bonded to the middle hydroxyl group of glycerol. Typical carbon numbers of the fatty acids linked to the two other hydroxyl groups are even numbers, being between $C_{14}$ and $C_{22}$. Fatty acid composition of biological origin may vary considerably among feed-stocks from different sources. While several double bonds may be present in fatty acids, they are non-conjugated (with at least one —$CH_2$— unit between the double bonds). With respect to configuration, the double bonds of natural fatty acids are mostly of cis form. As the number of the double bonds increase, they are generally located at the free end of the chain. Lengths of hydrocarbon chains and numbers of double bonds depend on the various plant or animal fats or waxes serving as the source of the fatty acid. Animal fats typically contain more saturated fatty acids than unsaturated fatty acids. Fatty acids of fish oil contain high amounts of double bonds, and the average length of the hydrocarbon chains is higher compared to fatty acids of plant oils and animal fats.

Prior to processing, starting materials of biological origin are commonly pretreated with any suitable known methods such as thermally, mechanically for instance by means of shear forces, chemically for instance with acids or bases, or physically with radiation, distillation, cooling, or filtering. The purpose of said chemical and physical pretreatments is to remove impurities interfering with the process or poisoning the catalysts, and reduce unwanted side reactions.

In a hydrolysis treatment, oils and fats react with water yielding free fatty acids and glycerol as the product. Three main processes for the industrial production of fatty acids are known: vapor splitting of triglycerides under high pressure, basic hydrolysis, and enzymatic hydrolysis. In the vapor splitting process, the hydrolysis of triglycerides using steam is carried out at temperatures between 100 and 300° C., under a pressure of 1-10 MPa, preferable conditions being from 250 to 260° C. and from 4 to 5.5 MPa. Metal oxides like zinc oxide may be added as the catalyst to accelerate the reaction.

The unsaturated fatty acids obtained from hydrolysis of natural oils can be dimerized to form dimers of unsaturated fatty acids. A variety of dimerization processes have been described. For example, in Kirk-Othmer: Encyclopedia of Chemical Technology, $3^{rd}$ Ed., vol. 7, Dimer acids, p. 768, a method is presented for producing dimeric acids from unsaturated carboxylic acids with a radical reaction using a cationic catalyst, the reaction temperature being 230° C. In addition to acyclic unsaturated dimeric acid as the main product, mono- and bi-cyclic dimers are also formed. In Koster R. M. et al., Journal of Molecular Catalysis A: Chemical 134 (1998) 159-169, oligomerization of carboxylic acids, carboxylic acid methyl esters, and synthetic alcohols and olefins is described, yielding corresponding dimers.

The oxygen atoms in carboxylic acids can be removed in the form of CO (decarbonylation), $CO_2$ (decarboxylation), or $H_2O$ (deoxygenation). Processes wherein the oxygen of a carboxylic acid or ester is removed are known. Decarboxylation of fatty acids removes $CO_2$ and results in hydrocarbons with one carbon atom less than the original molecule. The feasibility of decarboxylation varies greatly with the type of carboxylic acid used as the starting material. Activated carboxylic acids containing electron-withdrawing groups in the position alpha or beta with respect to the carboxylic group lose carbon dioxide readily at slightly elevated temperatures. In this case, the RC—COOH bond is weakened by the electron-withdrawing group on the carbon chain. With other types of carboxylic acids, the RC—COOH bond is strong and cleavage of carbon dioxide is difficult. A suitable catalyst is required for this reaction. For example, in Maier, W. F. et al., Chemische Berichte (1982), 115(2), 808-812, hydrocarbons are produced from carboxylic acids using heterogeneous $Ni/Al_2O_3$ and $Pd/SiO_2$ catalysts at 180° C. under hydrogen atmosphere. Further examples of decarboxylation and hydrogenation of oxygen containing compounds are disclosed in Laurent, E., Delmon, B.: Applied Catalysis, A: General (1994), 109(1), 77-96, and 97-115, wherein pyrolysis oils derived from biomass were subjected to hydrogenation using sulfided $CoMo/\gamma-Al_2O_3$ and $NiMo/\gamma-Al_2O_3$ catalysts at 260-300° C., under a hydrogen pressure of 7 MPa.

In published U.S. Publication No. 2007/0131579, processes for converting unsaturated carboxylic acids to saturated hydrocarbons are described. The processes employ steps of: (a) oligomerization of unsaturated fatty acids forming dimer acids; (b) pre-hydrogenation to remove the C=C double bond(s); (c) de-oxygenation of the dimer acids in the form of decarboxylation and/or decarbonylation; and (d) optional hydrofinishing to remove double bonds and aromatics. Once the dimer acids are formed, tedious three steps are required in these disclosed processes to generate saturated hydrocarbons. Furthermore, this patent publication discloses a preferred product composition containing 20-90% naphthenes.

JP 76031241B discloses insulating oils formed by dimerization/trimerization of unsaturated fatty acids followed by hydrogenation. Oxygen atoms are removed in the form of water via hydrogenation, which requires two steps of hydrogenation to achieve.

With recent developments in biodiesel production, unsaturated fatty acids and their esters are increasingly available. Therefore it is desirable to take advantage of the renewable feed-stocks, thus saving non-renewable petroleum raw materials. Despite of the above teaching in the art, there is an need for an alternative and simpler process for producing saturated hydrocarbons from starting materials of biological origin, and to avoid the problems associated with the solutions disclosed in the prior art.

Low temperature performance is critical for engine oils because of the cold temperature conditions that engines are exposed to prior to start-up in various cold climates. A lube oil base stock that provides improved low temperature performance could allow inclusion of lower quality, less expensive co-base stocks or a reduction in the amount of viscosity modifier or pour point depressant in the engine oil formulation. Hence, there is also a need for lube base stocks with improved low temperature properties to improve cold start performance of engines under cold environmental conditions.

SUMMARY

The present disclosure is directed to lubricant base stocks with improved low temperature properties and processes for producing such base stocks from renewable biological sources.

According to the present disclosure, there is provided a lube base stock produced from a renewable biological source comprising from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160.

According to the present disclosure, there is also provided a lube base stocks with improved low temperature properties produced from a renewable biological source having a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C.

According to the present disclosure, there is also provided a lube base stock produced from a renewable biological source comprising from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by processes for making one or more unsaturated oligomeric acids and one or more saturated hydrocarbons.

According to the present disclosure, there are also provided lube base stocks with improved low temperature properties produced from a renewable biological source having a $^{14}C$ level ranging from 2 to 101% of the modern day $^{14}C$ level in the atmosphere, and wherein the lube base stocks yield a CCS ratio (Cold Crank Simulator (CCS) viscosity to the predicted CCS viscosity by Walther equation) of less than or equal to 0.85 at −35° C., and the lube base stocks are made by processes for making one or more unsaturated oligomeric acids and one or more saturated hydrocarbons.

The lube base stocks from a renewable biological source are made by processes including the following steps: (1) oligomerization of unsaturated fatty acids from biological sources forming dimer acids; and then optionally (2) hydrogenation of the dimer acids in a substantially single step for obtaining saturated hydrocarbons.

In one form of the present disclosure, lube base stocks from a renewable biological source are made by processes for making one or more unsaturated oligomeric acids comprising oligomerizing one or more unsaturated carboxylic acids having from 4 to 38 carbon atoms in the presence of a catalyst, wherein the catalyst is a molecular sieve, and wherein the one or more unsaturated oligomeric acids comprise less than 90% by weight of cyclic oligomers.

In another form of the present disclosure, lube base stocks from a renewable biological source are made by processes for making one or more saturated hydrocarbons comprises oligomerizing one or more unsaturated carboxylic acids having from 4 to 38 carbon atoms in the presence of a molecular sieve catalyst to form one or more unsaturated oligomeric acids including less than 90% by weight of cyclic oligomers, and hydrogenating the one or more unsaturated oligomeric acids via contact with hydrogen in the presence of a hydrogenation catalyst to form one or more saturated hydrocarbons.

Further according to the present disclosure, there are provided lube base stocks from a renewable biological source made by hydrogenation of dimer acids from biological sources in a substantially single step.

BRIEF DESCRIPTION OF THE DRAWINGS

To assist those of ordinary skill in the relevant art in making and using the subject matter hereof, reference is made to the appended drawings, wherein.

DETAILED DESCRIPTION

Figure 1:
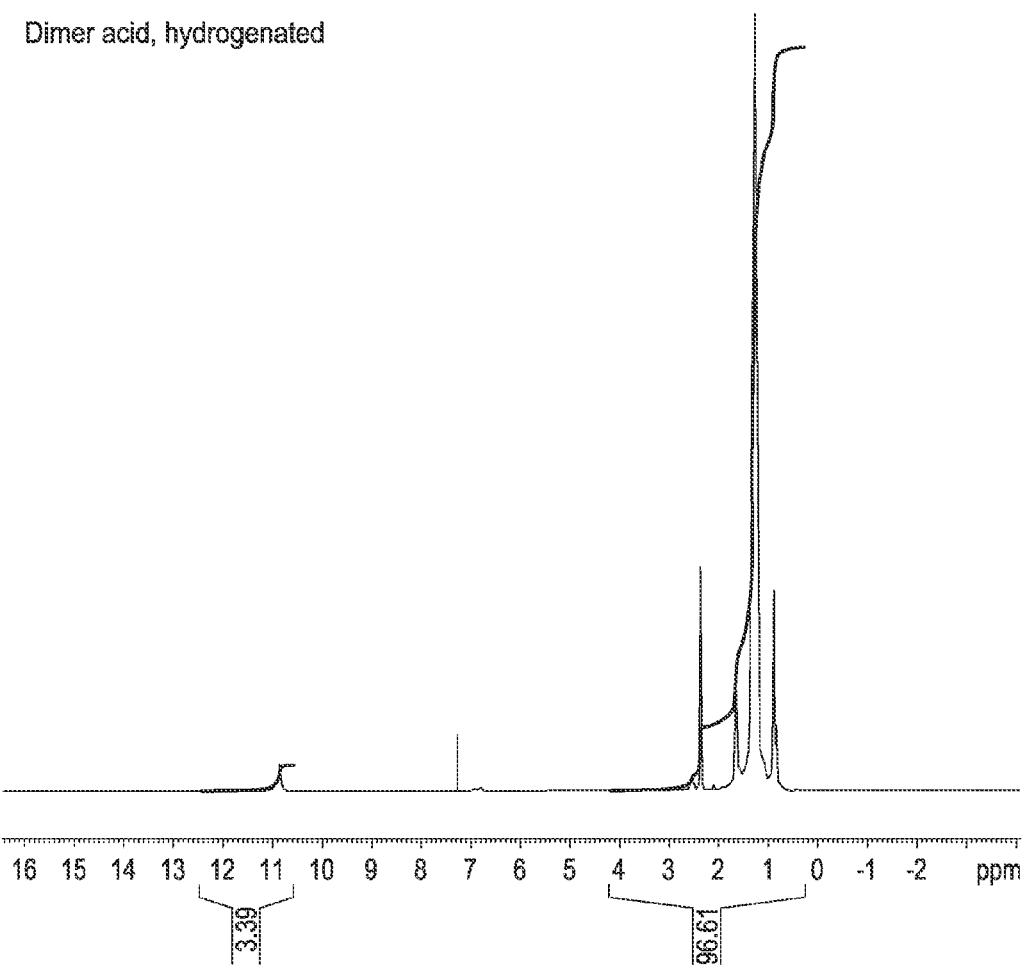
FIG. 1 is the $^1$H NMR spectrum of hydrogenated dimer acid that was used as the starting material for Examples 1 and 2.
Figure 2:
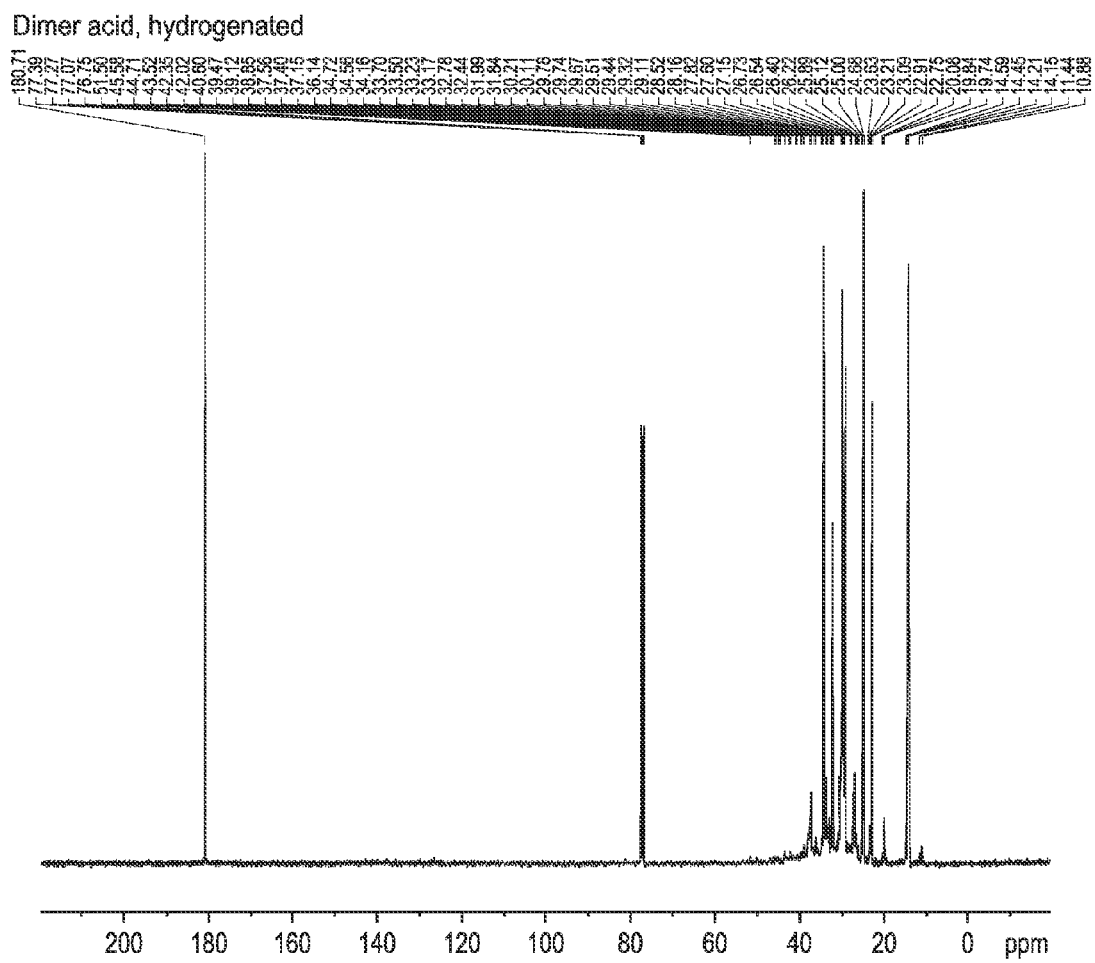
FIG. 2 is the $^{13}$C NMR spectrum of hydrogenated dimer acid that was used as the starting material for Examples 1 and 2.
Figure 3:
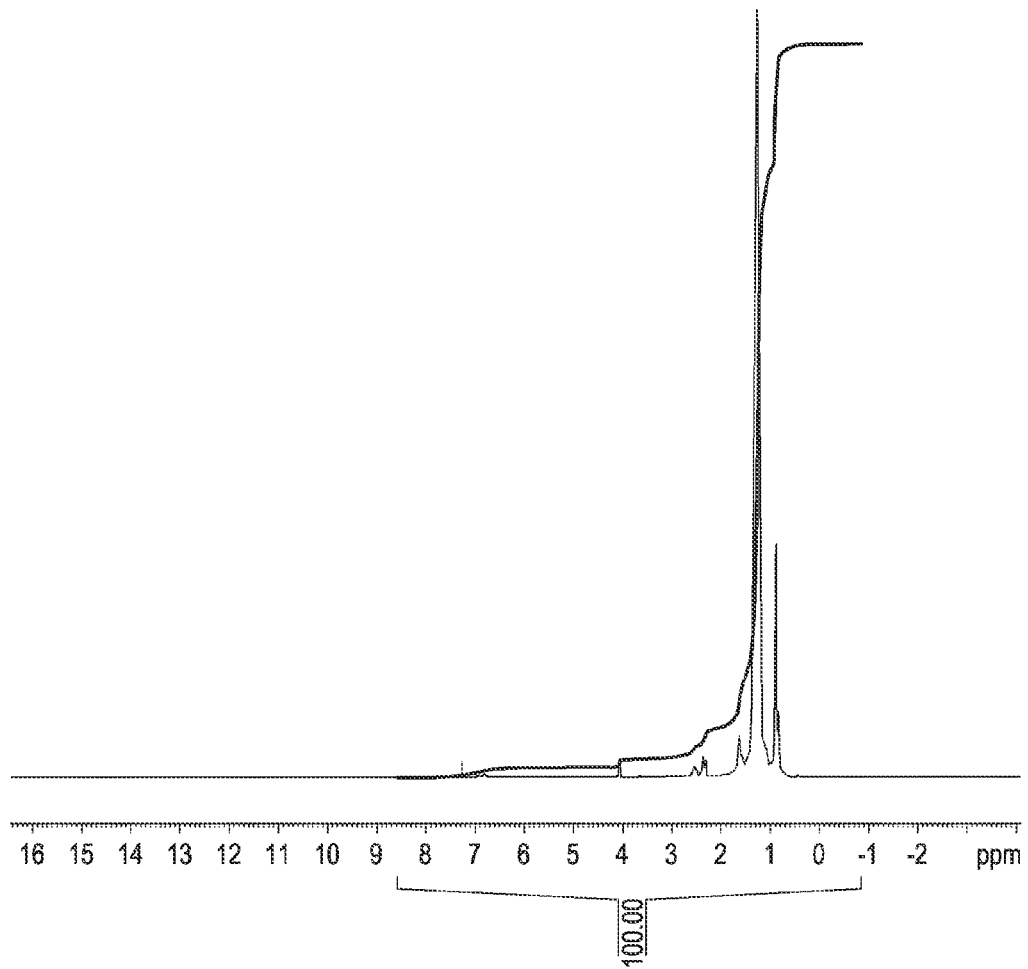
FIG. 3 is the $^1$H NMR spectrum of products from Example 1.
Figure 4:
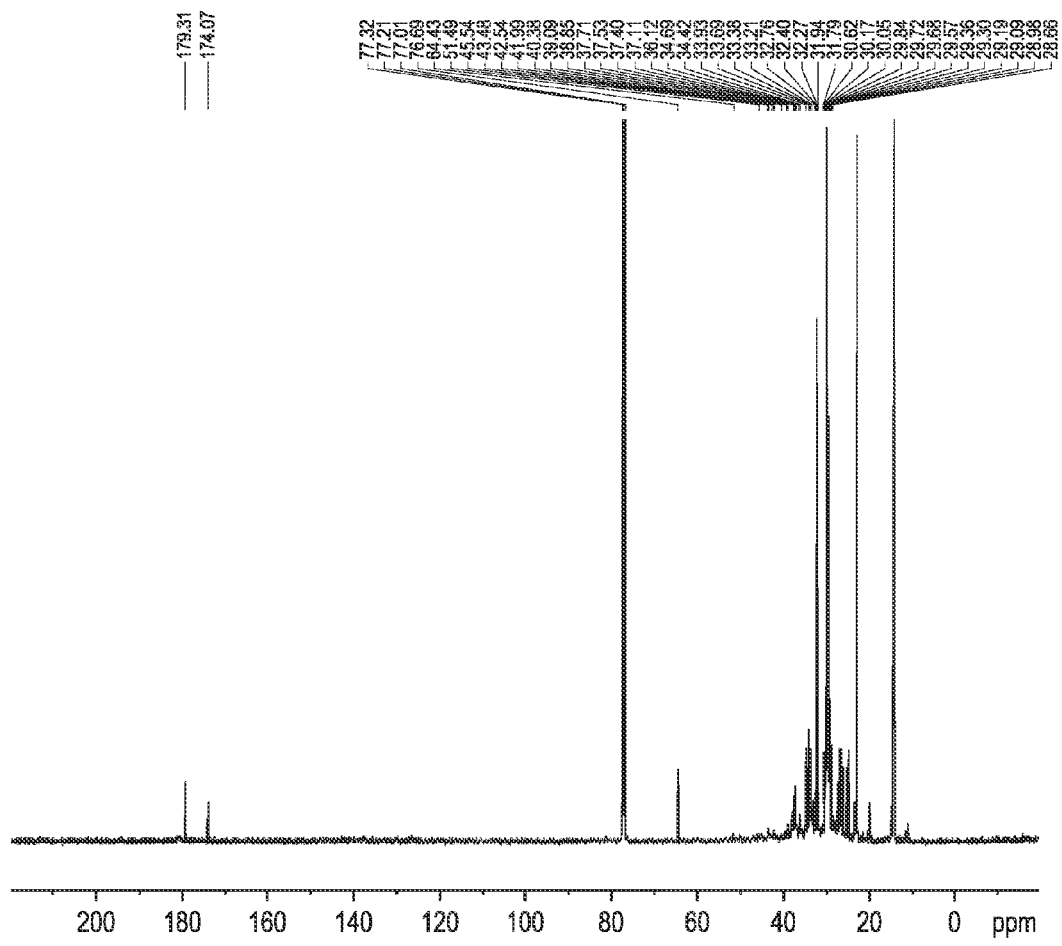
FIG. 4 is the $^{13}$C NMR spectrum of products from Example 1.

All numerical values in this disclosure are understood as being modified by "about" or "approximately" the indicated value, and take into account experimental error and variations that would be expected by a person having ordinary skill in the art.

The Applicants have unexpectedly and surprisingly discovered that lube base stocks made from renewable biological sources via the processes disclosed herein yield improved low temperature properties compared to lube base stocks made from nonrenewable fossil based sources. The present disclosure relates to lube base stocks made from renewable biological sources that unexpectedly yield a CCS ratio (Cold Crank Simulator (CCS) viscosity to the predicted CCS viscosity by Walther equation) at −35° C. less than or equal to 0.85, or less than or equal to 0.75, or less than or equal to 0.70, or less than or equal to 0.60, or alternatively less than or equal to 0.58, or alternatively less than or equal to 0.56, or alternatively less than or equal to 0.54, or alternatively less than or equal to 0.52, or alternatively less than or equal to 0.50, or alternatively less than or equal to 0.48, or alternatively less than or equal to 0.46. The lube base stocks made from renewable biological sources via the processes disclosed herein yield a CCS ratio lower than not only Group I and Group II lube base stocks, but also known Group III and Group IV base stocks (PAOs). This superior low temperature performance is unexpected because the inventive lube base stocks made from renewable biological sources via the processes disclosed herein were expected to behave similarly to API Group I to IV base stocks made from nonrenewable fossil based sources. The CCS ratios of prior art Group I and Group II (solvent dewaxed) lube base stocks are generally greater than 1.0. The CCS ratios of prior art Group III stocks, such as Visom™, are generally on the order of 1.0. The CCS ratios of prior art Group IV stocks (PAO) are generally on the order of 0.6. With the exception of the lube base stocks from renewable biological sources of the instant disclosure, there are no other known base stocks with CCS ratios as low as of 0.5.

In one form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160.

In another form of the present disclosure, a lube base stock produced from a renewable biological source has a $^{14}$C level ranging from 2 to 101% of the modern day $^{14}$C level in the atmosphere, and wherein the lube base stock yields a CCS ratio (Cold Crank Simulator (CCS) viscosity to the predicted CCS viscosity by Walther equation) of less than or equal to 0.85 at −35° C.

In another form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and the lube base stock is made by processes for making one or more unsaturated oligomeric acids and one or more saturated hydrocarbons.

In another form of the present disclosure, a lube base stock produced from a renewable biological source has a $^{14}$C level ranging from 2 to 101% of the modern day $^{14}$C level in the atmosphere, and wherein the lube base stock yields a CCS ratio (Cold Crank Simulator (CCS) viscosity to the predicted CCS viscosity by Walther equation) of less than or equal to 0.85 at −35° C., and the lube base stock is made by processes for making one or more unsaturated oligomeric acids and one or more saturated hydrocarbons.

In still another form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and is made by processes including the following steps: (1) oligomerization of unsaturated fatty acids from biological sources forming dimer acids; and then optionally (2) hydrogenation of the dimer acids in a substantially single step for obtaining saturated hydrocarbons.

In still another form of the present disclosure, a lube base stock produced from a renewable biological source has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and is made by processes including the following steps: (1) oligomerization of unsaturated fatty acids from biological sources forming dimer acids; and then optionally (2) hydrogenation of the dimer acids in a substantially single step for obtaining saturated hydrocarbons.

In still yet another form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and is made by processes for making one or more unsaturated oligomeric acids comprising oligomerizing one or more unsaturated carboxylic acids having from 4 to 38 carbon atoms in the presence of a catalyst, wherein the catalyst is a molecular sieve, and wherein the one or more unsaturated oligomeric acids comprise less than 90% by weight of cyclic oligomers.

In still yet another form of the present disclosure, a lube base stock produced from a renewable biological source has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and is made by processes for making one or more unsaturated oligomeric acids comprising oligomerizing one or more unsaturated carboxylic acids having from 4 to 38 carbon atoms in the presence of a catalyst, wherein the catalyst is a molecular sieve, and wherein the one or more unsaturated oligomeric acids comprise less than 90% by weight of cyclic oligomers.

In another form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and is made by processes for making one or more saturated hydrocarbons comprises oligomerizing one or more unsaturated carboxylic acids having from 4 to 38 carbon atoms in the presence of a molecular sieve catalyst to form one or more unsaturated oligomeric acids including less than 90% by weight of cyclic oligomers, and hydrogenating the one or more unsaturated oligomeric acids via contact with hydrogen in the presence of a hydrogenation catalyst to form one or more saturated hydrocarbons.

In another form of the present disclosure, a lube base stock produced from a renewable biological source has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and is made by processes for making one or more saturated hydrocarbons comprises oligomerizing one or more unsaturated carboxylic acids having from 4 to 38 carbon atoms in the presence of a molecular sieve catalyst to form one or more unsaturated oligomeric acids including less than 90% by weight of cyclic oligomers, and hydrogenating the one or more unsaturated oligomeric acids via contact with hydrogen in the presence of a hydrogenation catalyst to form one or more saturated hydrocarbons.

In another form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160, and is made by hydrogenation of dimer acids from biological sources in a substantially single step.

In another form of the present disclosure, a lube base stock produced from a renewable biological source has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and is made by hydrogenation of dimer acids from biological sources in a substantially single step.

Lube Base Stock from Renewable Biological Sources Embodiments:

Two-dimensional gas chromatography (also referred to herein as "GC×GC" or "2DGC") was used for characterizing the renewable base stocks and prior art comparative base stocks of the present disclosure for chemical composition. In particular, the 2DGC technique was used for characterizing the inventive base stocks and the comparative base stocks for weight % paraffins, weight % 1-ring naphthenes, and weight % combined 2-ring naphthenes and aromatics.

Comprehensive two-dimensional gas chromatography (GC×GC) is a separation technique developed in recent years. It can provide improved chromatographic resolution of complex mixtures. GC×GC employs a single GC unit containing two separation columns of different selectivity. A modulation unit situated between these two separation columns performs solute focusing and reinjection into a short, high-speed second column. The modulation mechanism is the key to accomplish this two-dimensional separation. GC×GC may be considered as a 'continuous' heart-cutting form of a conventional single heart-cutting multidimensional GC that has been established for many years.

These advances have enabled GC×GC to become an ideal technique for analyzing complex mixtures, such as the lube base stocks disclosed in this application. One advantage of GC×GC technique is its enhanced sensitivity due to the re-focusing process during the modulation operation. Another advantage of the GC×GC technique is the qualitative analysis through compound class separation. Hence, in addition to single component separation, it also provides the compound class homologous series trend information. This trend information can be further combined with the reference standard compounds or the GC-MS data to greatly improve the capability of elucidation of individual molecular structure in the complex mixtures.

Figure 12:
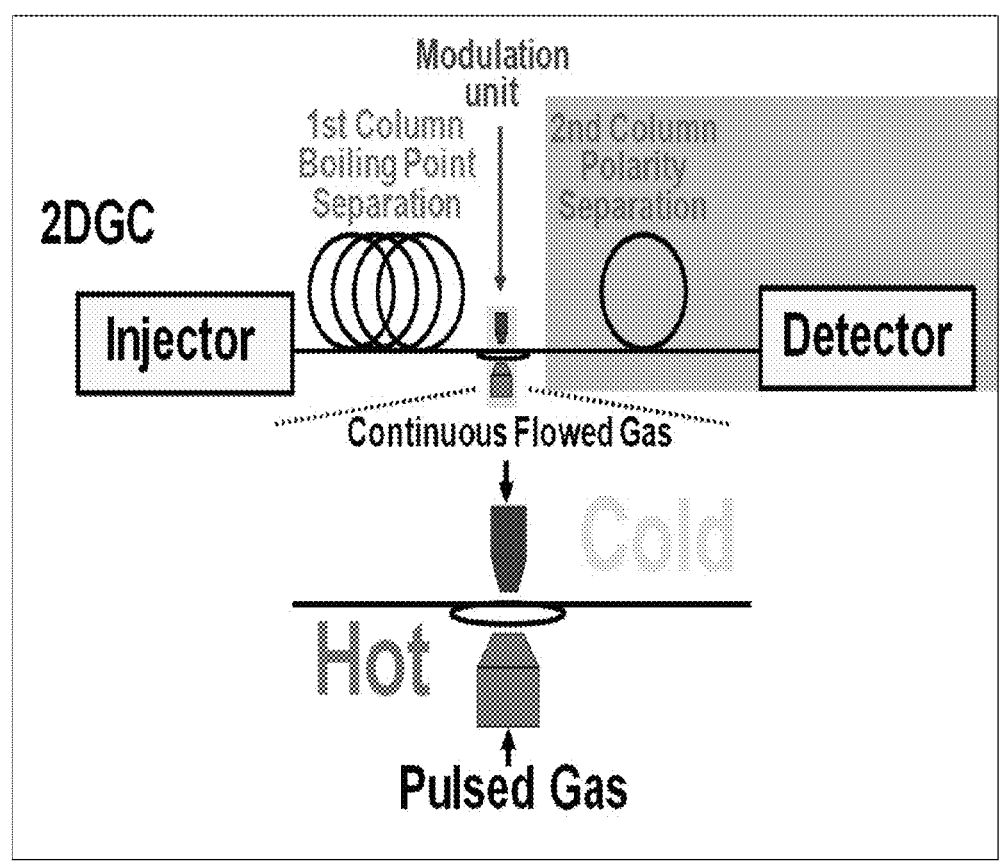
FIG. 12 is the layout of the two-dimensional gas chromatography technique used to analyze the composition of the base stocks of the present disclosure.

The 2DGC (GC×GC) system consists of an Agilent 6890 gas chromatograph (Agilent Technology, Wilmington, Del.) configured with inlet, columns, and detectors, as shown in FIG. 12. A split/splitless inlet system with a 100 sample position tray autosampler was used. The two-dimensional capillary column system utilizes a non-polar first column (BPX-5, 30 meter, 0.25 mm I.D., 1.0 micron film), and a polar (BPX-50, 2 meter, 0.25 mm I.D., 0.25 micron film), second column. Both capillary columns are the products of SGE Inc. (Austin, Tex.). A looped thermal modulation assembly based on Zoex technology (Zoex Corp. Lincoln, Nebr.), which is liquid nitrogen cooled "trap-release" looped thermal modulator, is installed between these two columns. A flame ionization detector (FID) is used for the signal detection. A 0.2 microliter sample was injected with 50:1 split at 300° C. inlet temperature. Carrier gas flow was ramped based on the head pressure. The head pressure is programmed from 24 psi with O-minute hold and 0.2 psi per minute increment to 42 psi with O-minute hold. The oven was programmed from 190° C. with O-minute hold and 2.0° C. per minute increment to 370° C. with O-minute hold. The hot jet was programmed from 240° C. with O-minute hold and 2.0° C. per minute increment to 390° C. with 15-minute hold. The total GC run time was 90 minutes. The modulation period was 10 seconds. The sampling rate for the detector was 100 Hz.

FIG. 12 shows a schematic of the GC×GC configuration. After data acquisition, it was processed for qualitative and quantitative analysis. The qualitative analysis converted data to a two-dimensional image that was processed by a commercial program ("Transform", Research Systems Inc. Boulder, Colo.). The two-dimensional image was further treated by "Photoshop" program (Adobe System Inc. San Jose, Calif.) to generate publication-ready images. An in-house program was used to quantify the peak volumes.

The two-dimensional chromatographic separation is a combination of non-polar column separation (1st column, X-axis) and polar column separation (2nd column, Y-axis). The non-polar column separation is based on the boiling point of the component in the sample mixture, which closely correlated to the carbon chain length. It can also be viewed as a boiling point separation. The polar column separation is based on the polarity of the component in the sample mixture, which closely correlated to the functional groups on the component. It can also be viewed as a compound class separation. With this detailed two-dimensional separation, the separated complex mixture can be systematically, qualitative and quantitative analyzed.

In addition to the qualitative analysis, the GC×GC technique also provides advantages in the quantitative analysis for complex mixtures than traditional GC. Because the GC×GC offers better separation for individual components, better-defined peak integrations and more accurate quantification are obtained. This improved quantitative analysis gives more accurate compositional information for complex mixtures such as the lube base stocks disclosed in this application. U.S. Pat. Nos. 7,641,786 and 7,642,095, both of which are herein incorporated by reference, further detail the 2DGC technique and its use for analyzing the composition of hydrocarbons.

The lube base stock compositions according to the present disclosure include at least one lube base stock produced from a renewable biological source. Typically lube base stocks are petroleum-derived; however, according to the present disclosure, such base stocks are derived from a renewable biological source, such as for example a natural oil characterizable as lube base stock, including animal oils and vegetable oils, and also algae sources. Such lube base stocks are also referred to herein as "renewable base stocks" or "RBS."

The origin of the lube base stocks produced by the process of the instant disclosure can be determined by the radioactive carbon $^{14}C$ level. Radiocarbon is produced in the atmosphere by collisions between cosmic-ray neutrons and $^{14}N$, after which it is quickly oxidized to $CO_2$. Plants take up the $^{14}CO_2$ for photosynthesis, and consequently they reflect "modern" levels of $^{14}C$. Once assimilation of $^{14}C$ ceases, levels of $^{14}C$ decrease through radioactive decay with a half-life of 5730 years. Hence, petroleum, which forms over millions of years, contains no detectable $^{14}C$. Therefore, $^{14}C$ is an ideal tracer for tracing the biological component in a lube base stock and fuel blends because all recent natural products are effectively pre-labeled with $^{14}C$. The $^{14}C$ level in the lube base stock produced by the process of the instant disclosure is from 2 to 101%, or from 99 to 101% of present day $^{14}C$ level. When used in blends with petroleum derived lube base stocks or fuels, the $^{14}C$ level in the blended base stock and fuels is in the range of 2-101% of present day $^{14}C$ level.

In one form of the present disclosure, a lube base stock produced from a renewable biological source includes from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160. The wt. % paraffins, wt. % 1-ring naphthenes, and wt. % combined 2-ring naphthenes and aromatics are determined by the 2DGC technique described above.

In yet another form of the present disclosure, a lube base stock produced from a renewable biological source with improved low temperature properties has a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C. The $^{14}C$ level may alternatively range from 30 to 101%, or 50 to 101%, or 65 to 101%, or 80 to 101%, or 90 to 101%, or 95 to 101%, or 99 to 101% of the modern day $^{14}C$ level in the atmosphere.

Alternatively, the lube base stock produced from a renewable biological source may include 15 to 30 wt. %, or 20 to 25 wt. % of paraffins. Alternatively, the lube base stock produced from a renewable biological source may include 45 to 65 wt. %, or 50 to 60 wt. % of 1-ring naphthenes. Alternatively, the lube base stock produced from a renewable biological source may include 5 to 35 wt. %, or to 30 wt. %, or 15 to 25 wt. % of combined 2-ring naphthenes and aromatics. Alternatively, the lube base stock produced from a renewable biological source may have a ratio of 1-ring naphthenes to paraffins of from 1.9 to 4.0, or 2.0 to 3.5, or 2.2 to 3.0.

The lube base stock produced from a renewable biological source has an olefin content of less than 5 wt. %, or less than 3 wt. %, or less than 2 wt. %, or less than 1 wt. %, or substantially no olefins as measured by proton NMR. Substantially no olefins means that the level is less than 0.5 wt. % in the lube base stock. Olefins are defined as unsaturated hydrocarbon compounds containing at least one carbon-to-carbon double bond.

Alternatively, the lube base stocks of present disclosure may contain less than 90% mono-cyclic (also referred to as "1-ring naphthenes" herein) naphthenes, or less than 80% mono-cyclic naphthenes, or less than 70% mono-cyclic naphthenes, or less than 60% mono-cyclic naphthenes, and greater than 20% mono-cyclic naphthenes, or greater than 30% mono-cyclic naphthenes, or greater than 40% mono-cyclic naphthenes, or greater than 50% mono-cyclic naphthenes, based on the 2DGC method.

Alternatively, the lube base stocks of present disclosure may contain less than 90% mono-cyclic (also referred to as "1-ring naphthenes" herein) naphthenes, or less than 80% mono-cyclic naphthenes, or less than 70% mono-cyclic naphthenes, or less than 60% mono-cyclic naphthenes, and greater than 20% mono-cyclic naphthenes, or greater than 30% mono-cyclic naphthenes, or greater than 40% mono-cyclic naphthenes, or greater than 50% mono-cyclic naphthenes, based on the 2DGC method. The lube base stock products of this disclosure contain less than 35%, or less than 25%, or less than 15%, or less than 5%, or less than 1%, or less than 0.1% of polycyclic naphthenes (also referred to as "2-ring naphthenes" herein) as determined by 2D GC.

The lube base stock produced from a renewable biological source of the present disclosure includes paraffins, 1-ring naphthenes, 2-ring naphthenes and aromatics. The lube base stocks produced from a renewable biological source of the present disclosure yield a unique chemical structure based on the wt. % paraffins, wt. % 1-ring naphthenes, and combined wt. % of 2-ring naphthenes and aromatics in the lube base stocks. This unique chemical structure can also be quantified by the ratio of 1-ring naphthenes to paraffins. For the purposes of the lube base stocks of the present disclosure, paraffins are molecules with long alkyl chains which are joined at positions other than the end carbon as shown below.

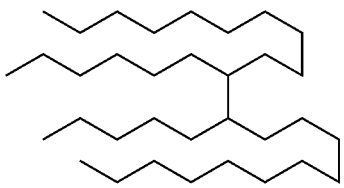 [SMILES: CCCCCCCCCCCC(CCCCC)C(CCCCCC)CCCCCCCCCC]

For the purposes of the lube base stocks of the present disclosure, 1-ring naphthenes are molecules where the naphthene ring is at least tri-substituted with alkyl groups and the length of the alkyl groups can vary as long as the total number of carbons stay constant in the molecule as shown below.

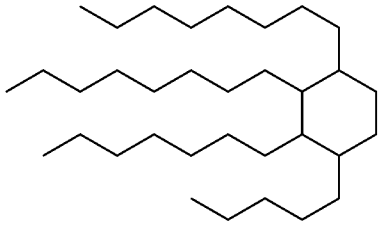 [SMILES: CCCCCCCCC1CCC(CCCCC)C(CCCCCCC)C1CCCCCCCC]

For the purposes of the lube base stocks of the present disclosure, 2-ring naphthenes are molecules where the naphthene rings are either fused or separated and are at least tri-substituted with alkyl groups, the length of the alkyl groups can vary as long as the total number of carbons stay constant in the molecule as shown below.

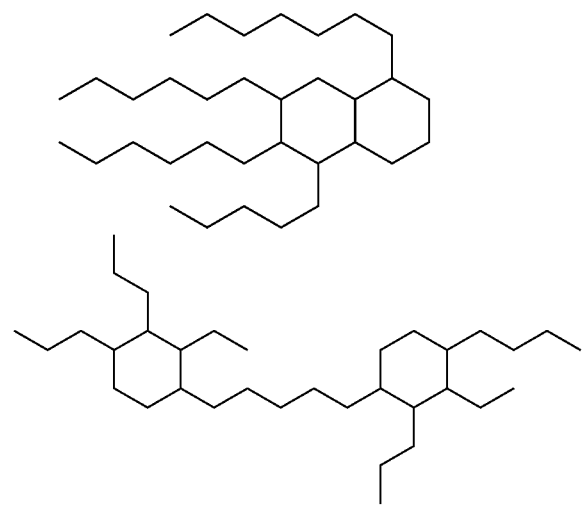

For the purposes of the lube base stocks of the present disclosure, aromatics are molecules where the aromatic ring is at least tri-substituted with alkyl groups, the length of the alkyl groups can vary as long as the total number of carbons stay constant in the molecule as shown below.

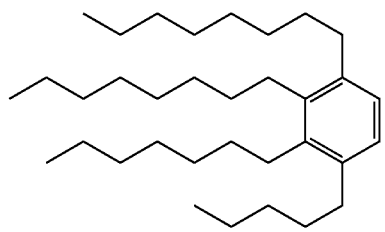 [SMILES: CCCCCCCCc1ccc(CCCCC)c(CCCCCCC)c1CCCCCCCC]

In yet another form of the present disclosure, a lube base stock produced from a renewable biological source with improved low temperature properties may be characterized using quantitative $^{13}$C NMR. Quantitative $^{13}$C NMR spectra were obtained using Cr(acac)$_3$ as a relaxation aid during acquisition. For example, all normal paraffins with carbon numbers greater than C$_9$ have only five inequivalent carbon NMR absorptions, corresponding to the terminal methyl carbons ($\alpha$), methylene carbons at the second, third, and fourth positions from the molecular ends ($\beta$, $\gamma$, and $\delta$, respectively), and the other carbon atoms along the backbone that have a common shift ($\epsilon$). The intensities of $\alpha$, $\beta$, $\gamma$, and $\delta$ are equal and the intensity of $\epsilon$ carbons depends on the length of the molecule. Similarly, side branches on the backbone of an iso-paraffin have unique chemical shifts and the presence of side-chain causes a unique shift at the tertiary site on the backbone to which it is anchored. It also perturbs the chemical shifts within three sites of the tertiary site, imparting unique chemical shifts ($\alpha'$, $\beta'$, and $\gamma'$) to the adjacent sites when they occur in the center of a long backbone. The number of free ends of molecules can be estimated by measuring the number of $\alpha$, $\beta$, $\gamma$, and $\delta$ carbons. Unique shifts also enable measuring the number of pendant side-chains of different length (which are called P-Me, P-Et, P-Pr, and P-Bu). The molecular ends that have a side branch at the 2, 3, 4, or 5 sites (which are called T-Me, T-Et, T-Pr, and T-Bu) can also be measured. The branching features are particularly valuable in characterizing lube basestocks.

The basestocks can be characterized by the "Free Carbon Index", which represents the measure of carbon atoms in an average molecule that are epsilon carbons:

FCI=(% epsilon carbons)*(Carbon Number)/100 where the Carbon Number is determined by $^{13}$C NMR as following:

Carbon Number=2/((mole % α carbon+mole % T-Me carbon+mole % T-Et carbon+mole % T-Pr carbon)/100)

More details of this technique can be found in "Composition and Analysis of Heavy Petroleum Fractions" by Klaus H. Altgelt and Mieczyslaw M. Boduszynski, pages 182-186, which are incorporated here as reference. The base stocks produced from a renewable biological source with improved low temperature properties of the present disclosure have a FCI of less than 4.0, or less than 3.5, or less than 3.0.

The lube base stocks of the present The lube base stocks of the present disclosure also include less than 10 wt. % oxygenates, or less than 8 wt. % oxygenates, or less than 5 wt. % oxygenates, or less than 3 wt. % oxygenates, or less than 1 wt. % oxygenates, or substantially no oxygenates. Substantially no oxygenates means that the level is less than 0.5 wt. % in the lube base stock. Oxygenates are defined as chemical compounds containing oxygen as a part of their chemical structure.

The carbon number (defined as the number of carbon atoms in each molecule) and the carbon number range of the lube base stock depend both on the biological starting material of the feedstock and the production process. A carbon number range for the lube base stocks disclosed herein may range from $C_{20}$ to $C_{60}$, or $C_{30}$ to $C_{50}$, whereas the carbon number range of particularly thick lube base stocks may be as high as from $C_{150}$ to $C_{550}$. The lube base stocks of the present disclosure also have consecutive carbon numbers (that is carbon numbers that fall one after the other in order) ranging from $C_{20}$ to $C_{60}$, or $C_{25}$ to $C_{55}$, or $C_{30}$ to $C_{50}$, or $C_{30}$ to $C_{40}$, or $C_{23}$ to $C_{36}$, or $C_{31}$ to $C_{36}$. This distinguishes the biological base stocks of the present disclosure from prior art Group IV PAO base stocks which based on the comonomers (such as octene or decene) used to oligomerize such PAO base stocks would not have consecutive carbon numbers falling within these ranges because of comonomers having an even number of carbon atoms, which would not yield consecutive carbon numbers after oligomerization. In addition, the lube base stocks of the present disclosure have a narrow carbon number distribution when produced from a single biological based feed, and in particular, at least 40 wt. %, or at least 50 wt. %, or at least 60 wt. %, or at least 70 wt. %, or at least 80 wt. % of the carbon numbers of the distribution falling at a single carbon number selected from the group consisting of $C_{30}$, or $C_{31}$, or $C_{32}$, or $C_{33}$, or $C_{34}$, or $C_{35}$, or $C_{36}$, or $C_{37}$, or $C_{38}$, or $C_{39}$, or $C_{40}$. Alternatively, the lube base stocks of the present disclosure may have consecutive carbon numbers ranging from $C_{20}$ to $C_{60}$ with at least 40 wt. %, or at least 50 wt. %, or at least 60 wt. %, or at least 70 wt. %, or at least 80 wt. % falling within a carbon number range from $C_{30}$ to $C_{40}$ when produced from a mixed feed of biological based sources, which results in a broader carbon number distribution than a single feed.

For lube base stocks of the present disclosure, the viscosity index is at least 80, or at least 90, or at least 100, or at least 110 as determined by the method of ASTM D 2270. The viscosity index of the product may be as high as 160, the product thus being suitable in base stock applications for any one of API Group I to Group V. More particularly, the lube base stocks of the present disclosure may have a viscosity index ranging from 80 to 160, or 100 to 160, or 90 to 150, or 100 to 140, or 110 to 130.

Depending on the degree of oligomerization controlled by the selection of catalyst, reaction temperature, residence time, the lube base stock produced in this disclosure can have a 100° C. viscosity of 1 to 100 cSt, most preferably 2 to 20 cSt, or alternatively 2 to 10 cSt, or alternatively 3 to 20 cSt, or alternatively 3 to 50 cSt, or alternatively 4 to 10 cSt, or alternatively 4 to 20 cSt, or alternatively 4 to 8 cSt, or alternatively 15 to 100 cSt, or alternatively 20 to 80 cSt. For the low viscosity range product, the width or distribution (from maximum carbon number to minimum carbon number) of the carbon number range is no more than 10 carbons, preferably no more than 9 carbons, and particularly preferably no more than 4 carbons (determined by field ionization mass spectrometry, FIMS). More than 50%, preferably more than 75% and particularly preferably more than 80% by weight of the base stock contains hydrocarbons belonging to this narrow carbon number distribution.

Sulfur content of the lube base stock of the disclosure is less than or equal to 300 ppm, or less than 200 ppm, or less than 100 ppm, or preferably less than 50 ppm, and particularly preferably less than 1 ppm (as measured by ASTM D 3120). Nitrogen content of said lube base stock of the disclosure is less than 100 ppm, preferably less than 10 ppm, and particularly preferably less than 1 ppm (as measured by ASTM D4629).

The properties of the lube base stocks with improved low temperature properties from renewable biological sources according to the disclosure, and described in the examples are excellent, and moreover, carbon number ranges and distillation ranges are very narrow. The process of the disclosure provides saturated hydrocarbons having superior viscosity properties and excellent low temperature properties.

Volatility of the lube base stock with a narrow boiling range, obtained according to the disclosure and measured according to Noack Volatility method (or ASTM D6375 modified method), is extremely low compared to similar lube base stock products of the prior art made from non-renewable fossil sources. The product Noack volatility can range from less than 5 wt. % for a 20 cSt and higher viscosity product to less than 50 wt. % for a fluid of 2.5 cSt. For a fluid of 3 to 8 cSt, the volatility typically can range from 3% to 25%. For fluid of 3.5 to 6 cSt, the volatility can range from 4% to 15% depending on fluid viscosity. For a 5.5 cSt base stock of this disclosure from a $C_{18}$ dimer acid, the Noack volatility is 5.5 wt. %, lower than that of a higher viscosity PAO of 5.8 cSt with Noack Volatility of 6% to 9%, depending on source. In another form of the lube base stock of the present disclosure, the Noack volatility is less than 10 wt. % for a viscosity of at least 4 cSt. In yet another form of the lube base stock of the present disclosure, the Noack the volatility is less than 8 wt. % for a viscosity of at least 4 cSt. In still yet another form of the lube base stock of the present disclosure, the Noack volatility is less than 6 wt. % for a viscosity of at least 4 cSt.

Figure 13:
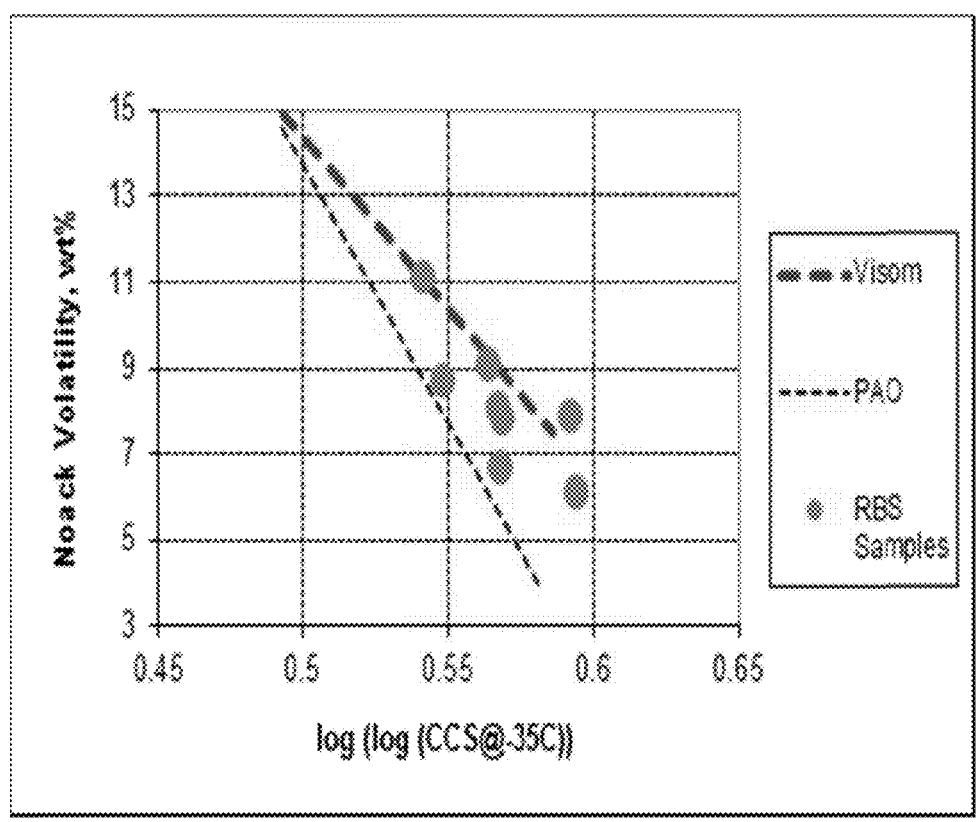
FIG. 13 is a plot of Noack volatility versus $\log_{10}$ ($\log_{10}$ (CCS viscosity at −35 deg. C.)) for inventive base stocks and prior art Group III and Group IV base stocks.

Alternatively, the relationship between Noack volatility and CCS at −35 deg. C. for the lube base stocks of the present disclosure may be expressed by a Noack volatility of less than $(-79.8*\log_{10}(\log_{10}(\text{CCS viscosity @}-35°\text{ C.}))+54.26)$ and greater than $(-120*\log_{10}(\log_{10}(\text{CCS viscosity @}-35°\text{ C.}))+73.71)$ as depicted in FIG. 13. This plot demonstrates the Noack volatility of the inventive renewable base stocks of the present disclosure versus the Noack volatility of a Group III+ slate and PAO slate (Group IV) and shows that the inventive base stocks are better than the PAO slate and less than Group III+ slate in Noack volatility as a function of CCS viscosity.

The lube base stock prepared according to the present disclosure is hydrolytically more stable and it has a structure not decomposing under humid conditions, unlike the esters and other base stocks containing hetero-atoms, such as fatty alcohol dimers. In addition, the oxidation resistance of saturated hydrocarbons is better than that of corresponding base stocks containing unsaturated groups on the basis of fatty acid or fatty alcohol dimers, or ester base stocks. A saturated hydrocarbon component does not decompose as easily as esters that form corrosive acids. A non-polar and saturated hydrocarbon component is obtained using the process of the present disclosure by removing the oxygen of alcohols, esters, or carboxylic acids in the hydrogenation step as well as the hetero-atoms of any impurities of the feedstock. Oligomerizing carboxylic acid derivatives yield a structure having branches formed by carbon-carbon bonds following hydrogenation treatment. In oligomerization of $C_{12:1}$-$C_{20:1}$ feed, lengths of the obtained branches are typically from $C_3$ to $C_{11}$. Such hydrocarbons have very low pour points favorable for lube base stock applications, and thus the product is liquid at very low temperatures, and further, it has a superior viscosity index. The produced saturated hydrocarbon product is a suitable component of lubricant base stocks without any mixing limitations, and further, it is compatible with lubricant additives.

Pour point of the high quality lube base stock obtained with the process of the present disclosure is usually, much lower than comparable prior art lube base stock obtained from direct petroleum processing. Depending on viscosity, the biological lube base stock will have pour point less than −15° C., preferably less than −20° C., preferably less than −30° C., preferably less than −40° C., still more preferably less than −45° C., even more preferably less than −50° C., and accordingly, the lube base stock is very suitable for demanding low temperature conditions.

Method of Making Embodiments:

The present disclosure also provides a process for making lube base stocks with improved low temperature properties from renewable biological sources. Fatty acids derived from natural oils from plant or animal or algae sources can be dimerized to form dimer acids. Subsequently, the C=C double bonds in the dimer acids are saturated and the oxygen removed in the form of $CO_2$, CO, or $H_2O$ under a hydrogen atmosphere in a substantially single step. The resulting saturated hydrocarbon molecules have surprisingly excellent low temperature lubricating properties.

In the process of the present disclosure, the feed comprises one or more component(s) selected from the group consisting of triglycerides, carboxylic acids having carbon numbers from $C_4$ to $C_{38}$, esters of $C_4$ to $C_{38}$ carboxylic acids and $C_1$-$C_{11}$ alcohols, $C_4$-$C_{38}$ carboxylic acid anhydrides, and $C_4$-$C_{38}$ alcohols. The feedstock is preferably selected from the group consisting of triglycerides, fatty acids having carbon numbers from $C_4$ to $C_{24}$, esters of $C_{12}$ to $C_{24}$ fatty acids and $C_1$-$C_3$ alcohols, $C_{12}$-$C_{24}$ fatty acid anhydrides, and $C_{12}$-$C_{24}$ fatty alcohols, and mixtures thereof. The feedstock preferably originates from starting materials of biological origin, or mixtures thereof.

Suitable starting materials of biological origin are selected from the group consisting of: a) plant fats, plant oils, plant waxes; animal fats, animal oils, animal waxes; fish fats, fish oils, fish waxes, and mixtures thereof; and b) free fatty acids or fatty acids obtained by hydrolysis, acid transesterification or pyrolysis reactions from plant fats, plant oils, plant waxes, animal fats, animal oils, animal waxes, fish fats, fish oils, fish waxes, and mixtures thereof; and c) esters obtained by transesterification from plant fats, plant oils, plant waxes, animal fats, animal oils, animal waxes, fish fats, fish oils, fish waxes, and mixtures thereof, and d) esters obtained by esterification of free fatty acids of plant, animal and fish origin with alcohols, and mixtures thereof; and e) fatty alcohols obtained as reduction products of fatty acids from plant fats, plant oils, plant waxes, animal fats, animal oils, animal waxes, fish fats, fish oils, fish waxes, and mixtures thereof; and f) waste and recycled food grade fats and oils, and fats, oils and waxes obtained by genetic engineering, and mixtures thereof; and g) mixtures of said starting materials.

In this context, plants and animals also include algae and insects, respectively. The starting material of biological origin may also contain free carboxylic acids and/or esters of carboxylic acids, or oligomerization products of biological starting materials, without substantially interfering with the process. Suitable feed-stocks are also all compound types mentioned that are produced either totally or partly synthetically.

Advantageous starting natural oils for the processes of the present disclosure for making lube base stocks with improved low temperature properties should contain a relatively high amount of components having a single double bond in the fatty acid (e.g., mono-unsaturated fatty acids). Examples of the mono-unsaturated fatty acids include cis-5-dodecenoic acid, myristoleic acid (cis-9-tetradecenoic acid, C14:1), palmitoleic (cis-9-hexadecenoic acid, C16:1), oleic acid (cis-9-octadecenoic acid, C18:1), gadoleic acid (cis-11-eicosenoic acid C20:1), erucic acid (cis-13-docosenoic acid C22:1). Although most natural occurring oils contain cis-isomers of fatty acids, their trans-analogs occurred naturally or via isomerization process during treatment, such as hydrogenation, can also be used. Other odd carbon number mono-unsaturated acids, cis or trans form, although rare in natural products, can also be used. Generally, oils rich in the cis-form of the mono-unsaturated acids are most abundant in natural oils especially plant-based oils, and are the preferred feeds. For example, Canola oil, some rapeseed oil or some mustard oil contains 57%-60% monounsaturated fat, olive oil is has 75% monounsaturated fat while tea seed oil commonly contains over 80% monounsaturated fat. Oils that contain some di-unsaturated fatty acid moiety can also be used for the processes disclosed herein. For lube applications, it may be advantageous to use oils with low amount of di-unsaturated fatty acid moiety.

When choosing a feed from animal fats, it is advantageous to choose one that contains high percentages of mono-unsaturated fatty acids and low amounts of fully saturated fatty acid or multi-unsaturated fatty acid. Although animal fats, lard and oils can be used for this process, the yields to unsaturated fatty acids and the final synthetic hydrocarbon base stocks may be lower than from plant-based oils because most animal fats, such as beef fat, pork fat, and suet, contain higher amounts of saturated fats than plant-based oils.

Freshly produced plant-based oils or animal-based fats/oils can be used as starting material. Used or treated plant oil or animal fats/oils can also be used as starting material. The used plant oils can be obtained from food preparation, cooking, or other processes that recover or recycle used plant oils or animal fats/oils. Many of the used plant oils may contain partially hydrogenated plant oils. Thus, they may contain glycerides of the naturally occurring acids (mostly cis-acids) and also glycerides of the corresponding isomerized trans-acids. These trans-acids of mono- or di-unsaturated acids are also suitable for the processes of this disclosure. In order to optimize product yields, the impurities in the used plant oils, such as water, decomposed products, sludge, and carry-over component from the foods should be removed by pretreatments known in the art, such as settlement and decantation, clarification, passing through drying column and similar procedures.

The rapeseed oils, canola oils, mustard oils or olive oils usually are-triglycerides of long-chain fatty acid esters. In particular, suitable seed oils for this embodiment may include oils which have a significant amount of the glycerides of mono-unsaturated acids, such as myristoleic acid, palmitoleic, oleic, gadoleic, behenic, erucic, and lauroleic acids. These fatty acids are most suitable in this disclosure. Fatty acid compositions of common plant oils are listed in Table 2.

Soybean oil contains a relatively high amount of di-unsaturation in the form of linolenic acid in the fatty acid moiety. It can be used as a starting material for this process. However, the high content of di- or tri-unsaturated fatty acids is not as desirable as the mono-unsaturated acids or esters. There are many reports of utilizing a genetically modified soybean plant to produce soybean oil ["Genetic enhancement of soybean oil for industrial uses: prospects and challenges", by Edgar B. Cahoon, USDA Research Service, AgBioForum 6 (1&2): 11-13; at the 2003 AgBioForum, and references therein]. Such genetically modified soy beans can produce oil with very high amount of oleic acid moiety, sometimes as high as 85% oleic acid content, vs. 25% oleic acid content from the traditional, i.e., naturally occurring, soybean plant. Oils from these genetically modified soybean plant with high oleic content are most-suitable for the processes described herein.

TABLE 2

Compositions of Common Plant Oils

| (Cn:no. of double bonds) | Soybean Oil (wt %) | Canola Oil (wt %) | Rapeseed Oil (wt %) | Sunflower Oil (wt %) | H. Mustard 2 (wt %) |
|---|---|---|---|---|---|
| Myristic (14:0) | | | | 0.1 | |
| Palmitic (16:0) | 11.0 | 3.9 | 2.8 | 6.1 | 2.5 |
| Palmitoleic (16:1) | 0.1 | 0.2 | 0.2 | | |
| Stearic (18:0) | 4.0 | 1.9 | 1.3 | 5.3 | 2.4 |
| Oleic (18:1) | 23.4 | 64.1 | 23.8 | 21.4 | 56.3 |
| Linoleic (18:2) | 53.2 | 18.7 | 14.6 | 66.4 | 5.5 |
| Linolenic (18:3) | 7.8 | 9.2 | 7.3 | | 2.2 |
| Arachidic (20:0) | 0.3 | 0.6 | 0.7 | | |
| Gadoleic (20:1) | | 1.0 | 12.1 | | 4.5 |
| Eicosadienoic (20:2) | | | 0.6 | | |
| Behenic (22:0) | 0.1 | 0.2 | 0.4 | | |
| Erucic (22:1) | | | 34.8 | | 20.7 |
| Others | | 0.2 | 1.3 | | |

In addition to the plant oils or animal fats/oils that can be used for these processes for making renewable biological based lube base stocks with improved low temperature properties, the fatty acid derivatives from plant oils or animal fats/oils can also be used herein. Examples of the derivatives include mono-esters derived from triglycerides (also known as mono-esters of the fatty acid moieties of the triglycerides). Methods of making such derivatives are known in the art, e.g., see Process Economic Program Report 251 "Biodiesel Production" by Stanford Research Institute (SRI), or U.S. Pat. Nos. 4,303,590; 5,354,878; and 5,525,126 and U.S. Patent Application Publication Nos. 2002/0010359 and 2003/0149289. Further examples of such derivatives include methyl esters of these fatty acids, commonly known as fatty acid methyl ester (FAME) or biodiesel, ethyl esters, propyl esters, and simple fatty acids. In the cases of the derivatives such as the methyl ester or unsaturated fatty acids, they can also be oligomerized to give oligomeric esters which can be converted into saturated hydrocarbons.

Since the purpose of the first step in the process is the oligomerization of components having double bonds, the feedstock preferably contains at least 10%, and more preferably at least 50%, by weight, of unsaturated and/or polyunsaturated compounds. The unsaturated compound can be mono- or poly-unsaturated, but is preferably a mono-unsaturated component, particularly preferably a $C_{16}$:1 and/or $C_{18}$:1 component present in the feedstock in concentrations of above 10%, and preferably above 40%, by weight.

Unsaturated fatty acids can be obtained from triglycerides in natural oil via hydrolysis. In a hydrolysis treatment, oils and fats react with water yielding free fatty acids and glycerol as the product. Three main processes for the industrial production of fatty acids are known: vapor splitting of triglycerides under high pressure, basic hydrolysis, and enzymatic hydrolysis. In the vapor splitting process, the hydrolysis of triglycerides using steam is carried out at temperatures between 100 and 300° C., under a pressure of 1-10 MPa, preferable conditions being from 250 to 260° C. and from 4 to 5.5 MPa. Metal oxides like zinc oxide may be added as the catalyst to accelerate the reaction.

In the processes for making renewable biological based lube base stocks with improved low temperature properties of the present disclosure, especially oligomerization reactions of materials of biological origin may be utilized in combination with hydrogenation reaction for the production of saturated hydrocarbons in a novel manner. For the oligomerization of unsaturated carboxylic acids and/or derivatives thereof, such as fatty acids, fatty acid esters, fatty alcohols, fatty acid anhydrides, and/or mixtures thereof, the monomers are converted into dimers with two monomers and/or into higher oligomers with three or more monomer units. In cases where starting materials of biological origin are used for the production of the lube base stocks with improved low temperature properties, it is necessary to extend the hydrocarbon chain length to reach the carbon number range required in the base stock applications, leaving predominantly carbon-carbon bonds in the main structure of the molecule. According to the disclosure, this is carried out by allowing the compounds having double bonds to react with each other, thus yielding hydrocarbons with carbon numbers in the range from $C_{20}$ to $C_{60}$. In the lube base stock applications, the carbon number range is typically from $C_{30}$ to $C_{50}$. In the oligomerization reaction, for instance, double bonds of the unsaturated fatty acid molecules react with each other, thus forming oligomers of fatty acids. For lube base stock applications, dimers of unsaturated fatty acids are the most preferable form, although trimers and tetramers are also formed and may be used. In case the feedstock contains polyunsaturated hydrocarbon chains, after oligomerization and hydrogenation treatment, greater amounts of trimers and hydrocarbons with ring structures are obtained than with monounsaturated hydrocarbon chains. Generally, it is preferable to use feed stock containing higher than 20% mono-unsaturated acid or ester, alternatively, higher than 40%, alternatively, higher than 50%, alternatively higher than 60% or alternatively high than 70%, alternatively higher than 80%, or alternatively greater than 90% mono-unsaturated acid or ester. Mixed unsaturated acid or esters, containing $C_{12}$, $C_{14}$, $C_{16}$, $C_{18}$, $C_{20}$, $C_{22}$, or $C_{24}$ unsaturated acid and/or esters can be used as feed. It is also preferable to choose the combination of the acids to give the average carbon number of feeds in the range of $C_{14}$ to $C_{22}$. This range of feeds will produce final lube base stocks with viscosity similar to Group IV base stock, ranging from 1 cSt at 100° C. to 100 cSt at 100° C. Unsaturated fatty acids can be used as starting materials. Corresponding unsaturated fatty esters and mixtures of fatty acid and esters can also be used as starting materials to give the same final product.

The unsaturated fatty acids obtained from hydrolysis of natural oils are oligomerized to form dimers and/or higher oligomers of unsaturated fatty acids. Oligomerization reactions are carried out with suitable catalysts at high temperature. Suitable catalysts include molecular sieves (both aluminosilicate zeolites and silicoaluminophosphates), amorphous aluminosilicates, cationic acidic clays, and other solid acid catalysts. According to International Zeolite Association (IZA) definitions, molecular sieves can be categorized according to the size of the pore opening Examples of the molecular sieves can be of the large (>12-ring pore opening), medium (10-ring opening) or small (<8-ring pore opening) pore type. The molecular sieves structure types can be defined using three letter codes. Non-limiting examples of small pore molecular sieves include AEI, AFT, ANA, APC, ATN, ATT, ATV, AWW, BIK, CAS, CHA, CHI, DAC, DDR, EDI, ERI, GIS, GOO, KFI, LEV, LOV, LTA, MER, MON, PAU, PHI, RHO, ROG, SOD, THO, and substituted forms thereof. Non-limiting examples of medium pore molecular sieves include AFO, AEL, EUO, HEU, FER, MEL, MFI, MTW, MTT, MWW, TON, and substituted forms thereof. Non-limiting examples of large pore molecular sieves include BEA, CFI, CLO, DNO, EMT, FAU, LTL, MOR and substituted forms thereof. More preferred zeolite catalyst have a Si/Al molar ratio of greater than 2 and at least one dimension of the pore openings greater than or equal to 10-ring. Most preferred solid zeolites include ZSM-5 (MFI), zeolite beta (BEA), USY family zeolites (FAU), MCM-22, MCM-49, MCM-56 (MWW). Mesoporous materials with pore openings greater than 20 Å, such as the MCM-41 family and SBA-15 type with aluminum incorporated into the structure and thus possess acidity, can also be used as oligomerization catalysts. Acidic clays include acidic, natural or synthetic Montmorillonites, bentonite, silica clay, alumina clay or magnesia clay or silica-alumina clay. Commercially available acidic forms of Filtrol clays are also suitable for this oligomerization process. Other solid acid catalysts, such as activated $WOx/ZrO_2$ catalysts, other metal oxides, Nafions or other acidic ion-exchanged resins, such as Dowex or Amberlyst cation exchanged are also suitable for the oligomerization reaction.

These oligomerization reactions can be carried out at 50° C. to 350° C., preferably 100° C. to 250° C., preferably 100° C. to 200° C. The reaction pressure can be atmospheric pressure to 500 psi. Atmospheric pressure or slightly above, up to 150 psi are convenient operating pressure. The reaction can also be carried out in the presence of small amount of hydrogen gas to prevent or improve catalyst aging and promote long catalyst lifetime. The hydrogen pressure can range from 1 psi to 300 psi, alternatively, 5 psi to 250 psi, alternatively 30 psi to 200 psi, and alternatively 50 to 250 psi. Optimum amount of hydrogen is used to reduce coke or deposit formation on catalyst, to promote long catalyst life time without significant hydrogenation of mono-unsaturated fatty acids. Furthermore, the presence of hydrogen may slightly reduce the di- or poly-unsaturated fatty acid. Thus, the presence of hydrogen may reduce the cyclic dimer or oligomer formation. This is beneficial for production of high paraffinic hydrocarbons at the end of the conversion. When solid catalyst is used, the reaction can be carried out in batch mode or in continuously stirred tank (CSTR) mode, or in fixed bed continuous mode. In a batch or CSTR mode, the amount of catalyst used may vary from less than 0.01% to 30 wt % of the feed, preferably 0.5 to 10 wt %, depending on reaction time or conversion level. The reaction time or residence time may vary from 5 minutes to 50 hours, preferably 20 minutes to 10 hours, preferably 30 minutes to 5 hours. The crude product can be isolated by filtration to remove the product. In fixed bed mode, the reaction residence time may vary from 5 minutes to 50 hours, preferably 20 minutes to 10 hours, more preferably 30 minutes to 5 hours; the weight hourly space velocity may vary from 0.2 g of feed/g of catalyst to 50 g of feed/g of catalyst, and preferably 0.3 to 10 g of feed/g of catalyst. The final conversion level varies from 10% to 100%, and alternatively from 20% to 90%. Usually high conversion is better. High conversion minimizes problems associated with product separation. In some instances, partial conversion, such as 50 to 80%, is preferred to prevent excessive formation of undesirable by-products.

The oligomerization reaction can also be catalyzed by homogeneous catalysts. Examples are hydrochloric acid, sulfuric acid, nitric acid, other small carboxylic acids or $BF_3$, promoted $BF_3$ catalysts, $AlCl_3$ or promoted $AlCl_3$ catalysts. When these homogeneous catalysts are used, 0.1 wt % to 10 wt % of catalyst may be used. Reaction temperatures for homogeneous acid catalyzed reaction range from 20° C. to 150° C. At the end of the reaction, these homogeneous acid catalysts are removed by aqueous wash or by adsorption by solid sorbents. The oligomerization reaction can also be catalyzed by the fatty acid itself when no other catalysts are added.

Generally, certain type of catalysts, such as shape-selective zeolites, the MCM-22 family (MWW), or the USY family (FAU), may impart unique control of the oligomerization reaction to favor the formation of dimer acid and minimize the formation of higher oligomers. The oligomerization by homogeneous catalysts, amorphous catalysts or clays may promote oligomerization to give higher degrees of oligomerization, such as trimers and tetramers. Furthermore, the proper choice of catalyst, catalyst pretreatment conditions, reaction temperature, and reaction time should help to minimize formation of cyclic dimer acid or ester, or hydrogen transfer reaction to produce poly-unsaturated starting acid or dimer acid and co-production of saturated starting acid. Formation of saturated starting acid will decrease the ultimate lube yields. Many clays, especially natural montmorillonite clay, can catalyze dimer formation with significantly higher amount of cyclic dimer formation. Molecular sieve catalysts can provide advantages of more dimerization and less cyclization. This improves the non-naphthene or paraffinic content of the finished lube base stock product.

The choice of catalyst is important for high conversion. Use of low cyclic oligomers and/or low hydrogen transfer yields saturated acid/esters, and, ultimately, high yields of final lubes with high desirable paraffinic content. Generally, molecular sieve material and clays of high silica to alumina ratio ($SiO_2/Al_2O_3$) are more desirable. The ratio of silica to alumina of these materials can range from 1 to 10,000. Typically, it is preferable to have a ratio of silica to alumina of from 2 to 5000, alternatively from 2 to 1000, alternatively from 2 to 500, alternatively from 4 to 1000, alternatively from 4 to 500, alternatively from 4 to 300, alternatively from 10 to 1000, or alternatively from 10 to 200. Higher silica to alumina ratio is generally equivalent to lower total number of acid sites. A lower total number of acid sites usually promotes the dimerization or oligomerization reaction and reduces the hydrogen transfer reaction, which reduces the formation of coke or very high molecular weight carbonaceous material, which prolongs catalyst lifetime and increase catalyst productivity.

Synthetic microporous materials are generally more preferable than naturally occurring clay materials because synthetic materials typically have a more controlled silica to alumina ratio and more controlled acid site density. Naturally occurring clay materials usually have very high density of acid sites, which promotes by-product formation and reduces catalyst productivity. Also, many naturally occurring clay materials have high amounts of other metal components, such as iron, calcium, and magnesium. These metals or oxides thereof promote by-product formation and reduce catalyst productivity.

In the processes of the current disclosure, the oligomerization products of unsaturated fatty acids or esters have less than 90% by weight of cyclic oligomers, preferably less than 80% by weight of cyclic oligomers, preferably less than 70% by weight of cyclic oligomers, preferably less than 60% by weight of cyclic oligomers, preferably less than 50% by weight of cyclic oligomers, preferably less than 40% by weight of cyclic oligomers, preferably less than 30% by weight of cyclic oligomers, preferably less than 20% by weight of cyclic oligomers, and still more preferably less than 10% by weight of cyclic oligomers. The products of the present disclosure may also have less than 3.0% by weight of cyclic oligomers, preferably less than 1.0% by weight of cyclic oligomers, and most preferably less than 0.1% by weight of cyclic oligomers.

The C=C double bond(s) in dimer acids can be saturated and the oxygen atoms removed in the form of $CO_2$ or CO or $H_2O$ in a single hydrogenation step. As used herein, the term "hydrogenation" is used to describe these conversions without specifically implying the actual reaction mechanisms or pathways. Alternatively, the term "hydro-deoxygenation" can be used to describe the conversion where the oxygen is substantially removed in the form of $H_2O$ and the double bonds are substantially saturated by hydrogen. Alternatively, the term "hydro-decarbonylation" can be used to describe the conversion where the oxygen is substantially removed in the form of CO and the double bonds are substantially saturated by hydrogen. Alternatively, the term "hydro-decarboxylation" can be used to describe the conversion where the oxygen is substantially removed in the form of $CO_2$ and the double bonds are substantially saturated by hydrogen.

In one process embodiment of this disclosure, the acid functionalities, i.e., carboxylic acid groups, are substantially removed in the form of $CO_2$ and double bonds are substantially saturated by hydrogen, in a single operation step. Consequently the term "hydro-decarboxylation" is used to describe the conversion. Removal of double bonds is inclusive of both aliphatic double bonds and aromatic double bonds. Hydro-decarboxylation can be carried out in a batch reactor such as an autoclave. The autoclave can have either static $H_2$ gas supply or flow-through capability of $H_2$ gas. Hydrogen pressure should be greater than atmospheric, preferably greater than 1 MPa, more preferably higher than 3 MPa. Temperature for the reaction should be in the range from 100 to 500° C., preferably from 200 to 400° C., and more preferably from 250 to 350° C. Catalysts suitable for the conversion reaction include metals such as Mo, Re, Fe, Ru, Co, Rh, Ir, Ni, Pd, Pt, Cu, Zn, as well as binary or ternary mixtures thereof supported on silica, alumina, zirconia, clays such as Kieselguhr, amorphous aluminosilicates, or zeolites. More preferably, the catalysts include Mo, Co, Ni, Pd, Pt, and binary or ternary mixtures thereof supported on silica, alumina, amorphous aluminosilicates, or clays, especially Kieselguhr. Most preferably the catalysts are Ni supported on Kieselguhr, CoMo/γ-$Al_2O_3$, and NiMo/γ-$Al_2O_3$. Metal content in the catalyst ranges from 0.1 wt % to 70 wt % of the catalyst. Loading of the catalyst is 1-30% by weight of the dimer acids, preferably 2-20%, or more preferably 5-10% by weight. Duration of the reaction ranges from 1-48 hours, or 1-20 hours, or 12-36 hours, or 24-30 hours. This conversion step can be carried out in fixed bed reactor, continuous stir tank reactor, or batch reactor. In any of these operations, it is advantageous to maintain partial pressure of hydrogen above 300 psi, or above 400 psi, or above 500 psi, or above 600 psi, or above 700 psi. During conversion, if $CO_2$, CO or $H_2O$ are generated, they can be present as gaseous form, thus increasing the total reactor pressure. Under this condition, it is important to maintain hydrogen partial pressure. This can be achieved by intermittently purge of the reactor gas, re-charge with hydrogen gas in batch or CSTR operation. Or alternatively, as in fixed bed operation, this can be achieved by withdrawing reactor gas at different location along the in fixed bed reactor; by two-stage hydrogenation with drawing reactor gas in between stages, or alternatively by stage injection of hydrogen. Many other means to maintain hydrogen pressure is also possible.

The reaction time or residence time can range from 5 minutes to 50 hours depending on type of catalyst used, reaction temperature and the amount (wt %) of catalyst in reactor. It is preferred to have a residence time of 10 minutes to 10 hours. Shorter residence time gives better efficiency for reactor usage. Longer residence time ensures high conversion to pure hydrocarbons. Usually an optimized reactor time is most desirable.

In various process steps disclosed herein, hydrocarbons may be used as diluents in the feedstock. Hydrocarbon can be for instance from biological origin and boil in diesel fuel range between 150 and 400° C., typically between 180 and 360° C. Sometimes, non-biological originated solvent can also be used. This includes solvents derived from petroleum or coal.

Selection of the biological feedstock has a strong influence on the composition and boiling range of the lube base stock product. Moreover, the feed may be fractioned by distillation to fractions having narrow carbon numbers that may be tailored for different applications. For feed-stocks containing carbon number $C_n$, where n=12, 14, 16, 18, 20, 22, or 24, the final hydrocarbon products may contain the carbon number of $x*C_n$, $x*C_n-1$, $x*C_n-2$, and down to $x*C_n-x$ (* is the multiplication sign), where x is the degree of oligomerization and can be any integer in the range of 2-10, preferable be 2-5, more preferably 2-3, and most preferably 2. For feed-stocks containing mixtures of unsaturated fatty acids with carbon numbers $C_n$ and $C_m$, where n and m can be 12, 14, 16, 18, 20, 22, or 24, dimerization will lead to products with carbon number of $C_{2n}$, $C_{n+m}$, and $C_{2m}$. Subsequent hydrogenation treatment will give hydrocarbon products containing carbon numbers of $C_{2n}$, $C_{2n-1}$, $C_{2n-2}$, $C_{n+m}$, $C_{n+m-1}$, $C_{n+m-2}$, $C_{2m}$, $C_{2m-1}$, and $C_{2m-2}$.

In one embodiment of the current disclosure, feed-stocks having hydrocarbon chain lengths of $C_{16}$, $C_{18}$, $C_{20}$, and $C_{22}$ and mixtures thereof can be used, dimerization gives dimer acids with the carbon number range of $C_{32}$-$C_{44}$. Hydrogenation treatment of the dimer acids gives carbon numbers of the hydrocarbon products in the range of $C_{30}$-$C_{44}$. The low end carbon number $C_{30}$ is achieved by hydro-decarboxylation of the $C_{32}$ dimer acids, while the high end carbon number $C_{44}$ is achieved by hydro-deoxygenation of $C_{44}$ dimer acids. Since the distillation range of the product mainly depends on the hydrocarbon chain length, narrow product fractions are obtained.

The carbon number range of the renewable biological based lube base stocks produced by the oligomerization and hydrogenation or hydro-decarboxylation process of the disclosure is narrow. For example, starting from feed-stocks containing $C_{18}$ unsaturated fatty acids, the carbon numbers in the products range from $C_{33}$ to $C_{36}$.

The molecular mass of the renewable biological based lube base stock product may be adjusted according to carbon number ranges necessary for different applications by adding suitable unsaturated carboxylic acids or olefins to the feedstock. Carboxylic acids having small molecules, or olefins cross-linking or oligomerizing with the fatty acids of triglycerides form short branches on the main hydrocarbon chain of the fatty acid. In case other natural cyclic compounds such as alpha pinene are used as additional components of the feedstock, molecules having ring structures in the side chain within the molecular chain are obtained. One or two additional components are preferably oligomerized in the product. According to the disclosure, corresponding lube base stock products tailored with respect to hydrocarbon chain lengths may also be produced from other carboxylic acids and from other biological components with short chains.

It was surprisingly found that with the processes of the present disclosure comprising oligomerization and hydro-decarboxylation steps, high-quality lube base stocks with improved low temperature properties may be produced from unsaturated carboxylic acids containing hetero-atoms, and from derivatives thereof, particularly from fatty acids, fatty acid esters, fatty alcohols, respective fatty acid anhydrides of biological origin, and/or mixtures thereof. The problems of the prior art processes and products obtained therewith may be avoided, or at least substantially reduced by means of the processes of the present disclosure.

Lubricant Composition Embodiments:

The lube base stocks from renewable biological sources of the present disclosure are well suited as lube base stocks without blending limitations, and further, the lube base stock products are also compatible with lubricant additives for lubricant formulations. The biological based lube base stocks of the present disclosure can optionally be blended with other lube base stocks to form lubricants. Useful co-base lube stocks include Group I, III, IV and V base stocks and gas-to-liquid (GTL) oils. One or more of the co-base stocks may be blended into a lubricant composition including the lube base stock from a biological renewable source at from 0.1 to 50 wt. %, or 0.5 to 40 wt. %, 1 to 35 wt. %, or 2 to 30 wt. %, or 5 to 25 wt. %, or 10 to 20 wt. %, based on the total lubricant composition.

Lubricants incorporating the biological based lube base stocks of the present disclosure may optionally include lube base stock additives, such as detergents, dispersants, antioxidants, anti-wear additives, pour point depressants, viscosity index modifiers, friction modifiers, de-foaming agents, corrosion inhibitors, wetting agents, rust inhibitors, and the like. The additives are incorporated with the biological based lube base stocks of the present disclosure to make a finished lubricant that has desired viscosity and physical properties. Typical additives used in lubricant formulation can be found in the book "Lubricant Additives, Chemistry and Applications", Ed. L. R. Rudnick, Marcel Dekker, Inc. 270 Madison Ave. New York, N.J. 10016, 2003.

When lubricating oil compositions contain one or more of the additives discussed above, the additive(s) are blended into the composition in an amount effective for it to perform its intended function. Typical amounts of such additives useful in the present invention are shown in Table 3 below. The total of the additional additives in the lubricating oil composition may range from 0.1 to 50 wt. %., or 0.5 to 40 wt. %, 1 to 35 wt. %, or 1 to 20 wt. % of the composition, or 2 to 18 wt. %, or 3 to 15 wt. %, or 4 to 10 wt. %, or 5 to 8 wt. %. Note that many of the additives are shipped from the manufacturer and used with a certain amount of base stock solvent in the formulation. Accordingly, the weight amounts in the table below, as well as other amounts mentioned in this patent, unless otherwise indicated are directed to the amount of active ingredient (that is the non-solvent portion of the ingredient). The wt. % indicated below are based on the total weight of the lubricating oil composition.

TABLE 3

Typical Amounts of Various Lubricant Oil Components

| Compound | Approximate wt % (useful) | Approximate wt % (preferred) |
|---|---|---|
| Detergent | 0.01-6 | 0.01-4 |
| Dispersant | 0.1-20 | 0.1-8 |
| Friction Reducer | 0.01-5 | 0.01-1.5 |
| Antioxidant | 0.0-5 | 0.0-1.5 |
| Corrosion Inhibitor | 0.01-5 | 0.01-1.5 |
| Anti-wear Additive | 0.01-6 | 0.01-4 |
| Pour Point Depressant | 0.0-5 | 0.01-1.5 |
| Anti-foam Agent | 0.001-3 | 0.001-0.15 |
| Base stock or base stocks | Balance | Balance |

Method of Use of Lubricant Composition Embodiments:

The biological based lube base stocks and lubricant compositions can be employed in the present disclosure in a variety of lubricant-related end uses, such as a lubricant oil or grease for a device or apparatus requiring lubrication of moving and/or interacting mechanical parts, components, or surfaces. Useful apparatuses include engines and machines. The biological based lube base stocks with improved low temperature properties of the present disclosure are most suitable for use in the formulation of automotive crank case lubricants, automotive gear oils, transmission oils, many industrial lubricants including circulation lubricant, industrial gear lubricants, grease, compressor oil, pump oils, refrigeration lubricants, hydraulic lubricants, metal working fluids. Furthermore, the biological based lube base stocks with improved low temperature properties of this disclosure are derived from renewable sources; it is considered a sustainable product and can meet "sustainability" standards set by different industry groups or government regulations.

The disclosure is now illustrated by means of the following non-limiting examples.

EXAMPLES

Example 1

Hydrogenation of Dimer Acid Using Supported Nickel Catalyst

An amount of 102.8 g hydrogenated $C_{36}$ dimer acid (CAS No. [68783-41-5], Aldrich catalogue #432369) was mixed with 5.32 grams of nickel on Kieselguhr (60 wt % nickel, Aldrich catalogue #208787) in a glass liner (catalyst loading: 5.2 wt %). The glass liner was then inserted in a 300-cc autoclave, sealed, and heated under a flowing $H_2$ (100 cc/min) at 516 psig and 300° C. with stirring for 24 hours. The products were separated by filtration and dried with anhydrous magnesium sulfate, yield 86% (24791-1234-4; theoretical yield: 89% for complete hydrogenation). Both NMR ($^1H$, $^{13}C$) and IR suggest that the carboxylic acid functionality has been significantly removed by hydrogenation (FIGS. 1-4, 6, and 7).

Example 2

Hydrogenation of Dimer Acid Using Supported Nickel Catalyst

Figure 5:
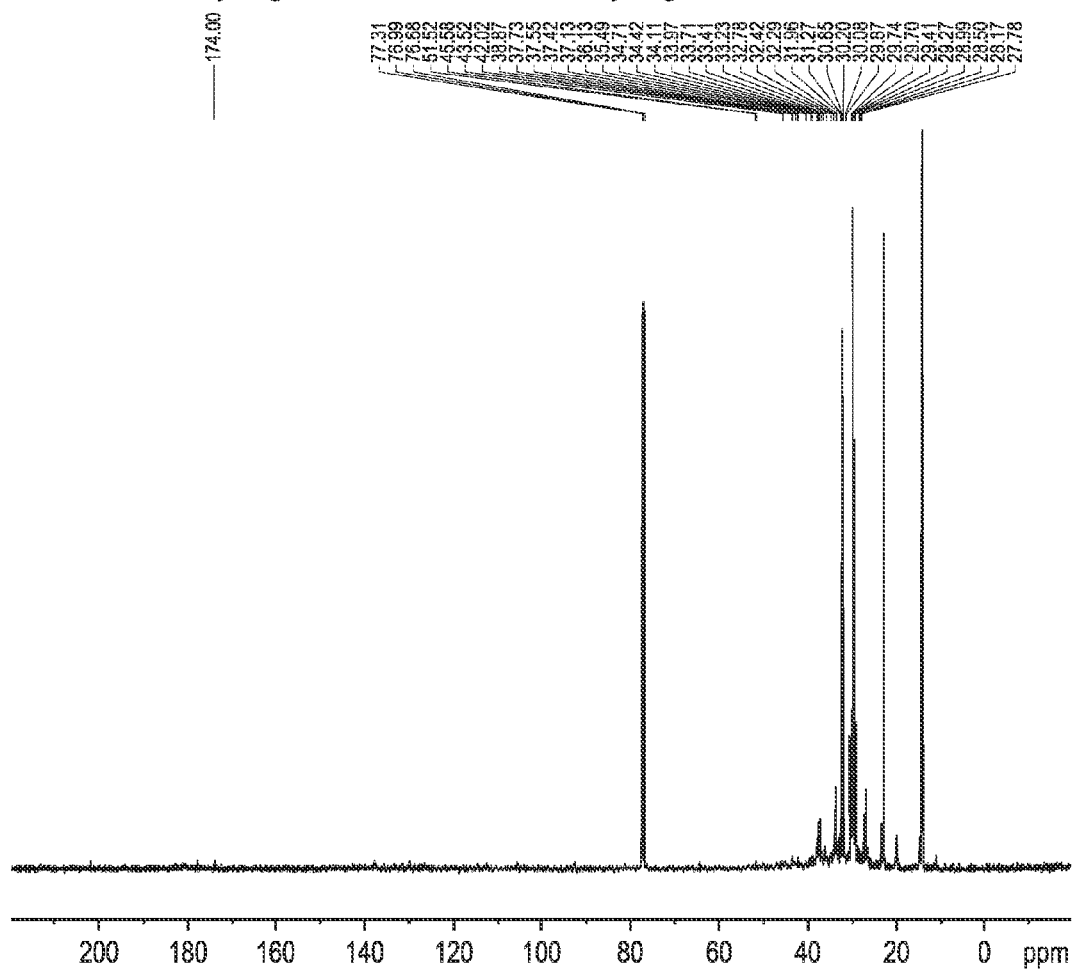
FIG. 5 is the $^{13}$C NMR spectrum of products from Example 2.
Figure 6:
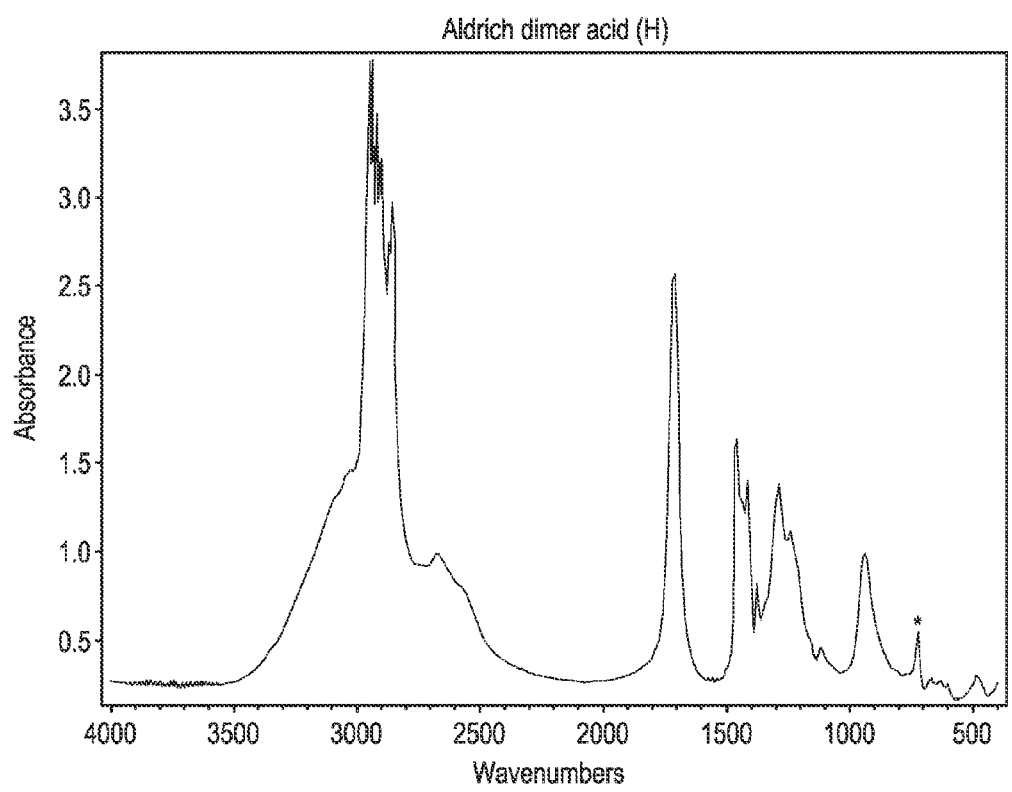
FIG. 6 is the IR spectrum of hydrogenated dimer acid that was used as starting material for Examples 1 and 2.
Figure 7:
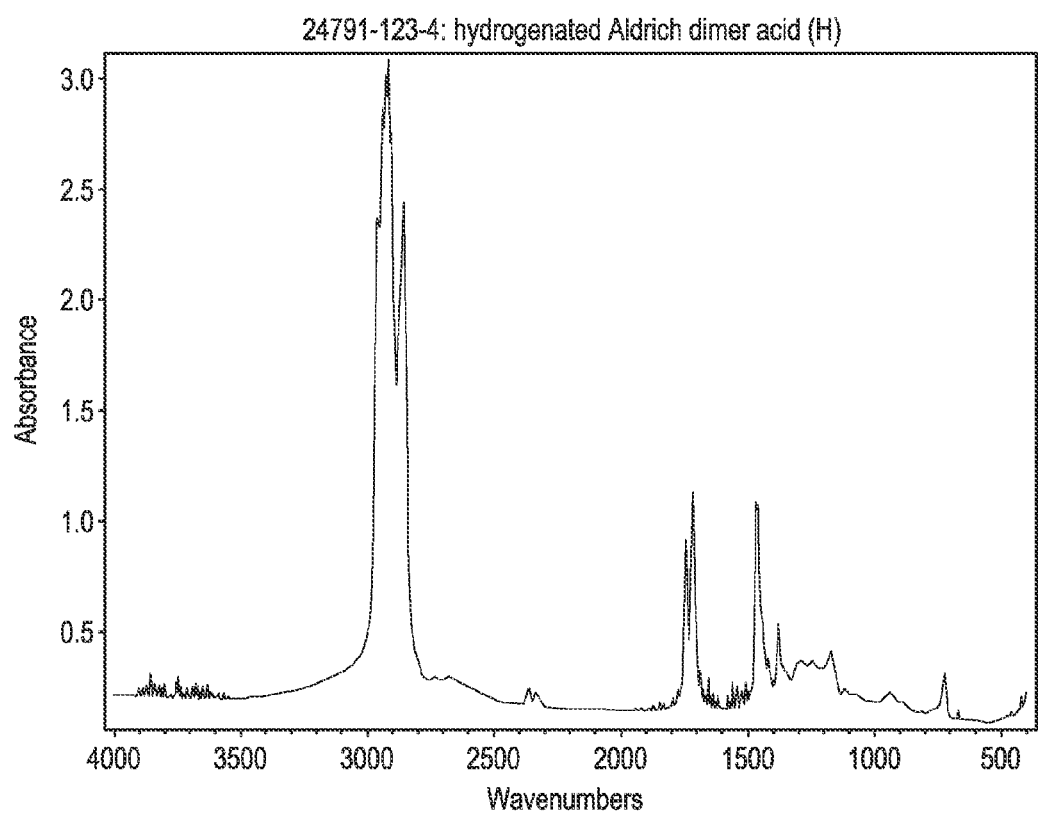
FIG. 7 is the IR spectrum of products from Example 1.
Figure 8:
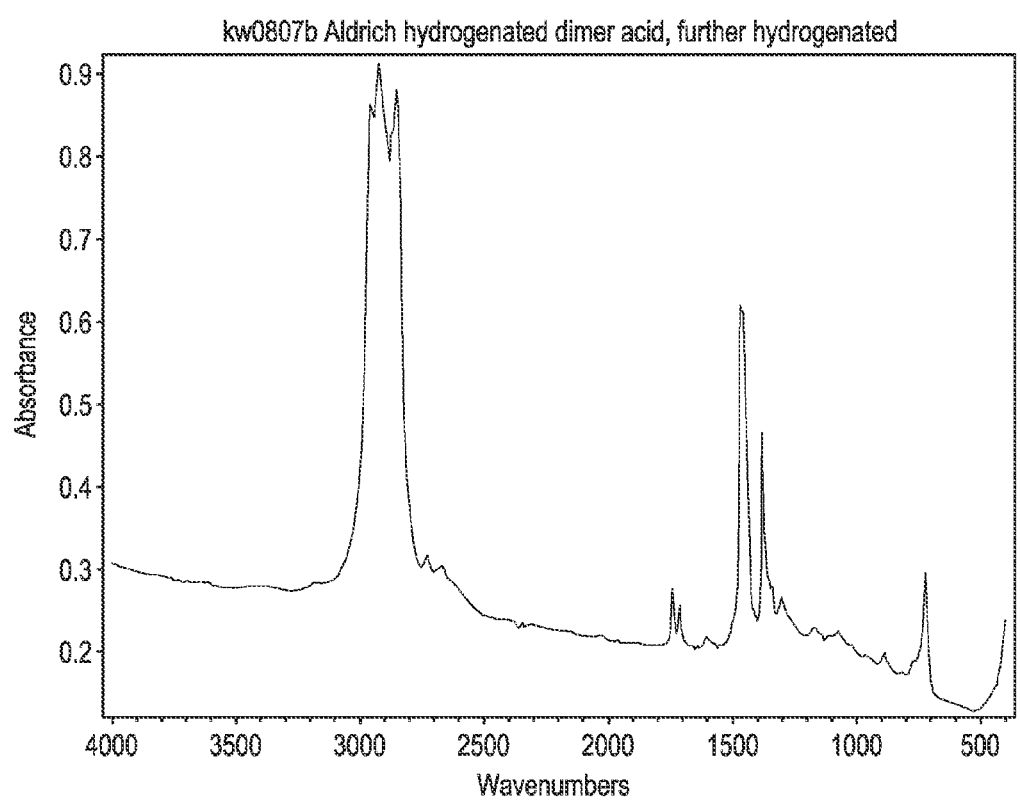
FIG. 8 is the IR spectrum of products from Example 2.

An amount of 110 grams hydrogenated $C_{36}$ dimer acid from Aldrich (CAS No. [68783-41-5], catalogue #432369) was mixed with 7.7 g of nickel on Kieselguhr (60 wt % nickel, Aldrich catalogue #208787) in a glass liner (catalyst loading: 7 wt %). The glass liner was then inserted in a 300-cc autoclave, sealed, and heated under a flowing $H_2$ (100 cc/min) at 520 psig and 313° C. with stirring for 24 hours. The products were separated by filtration and dried with anhydrous magnesium sulfate, yield 78% (24534-2; theoretical yield: 89% for complete hydrogenation). Both $^{13}C$ NMR and IR suggest that the carboxylic acid functionality has been nearly completely removed by hydrogenation (FIGS. 5 and 8).

Example 3

Hydrogenation of Dimer Acid Using Supported Nickel Catalyst

Figure 9:
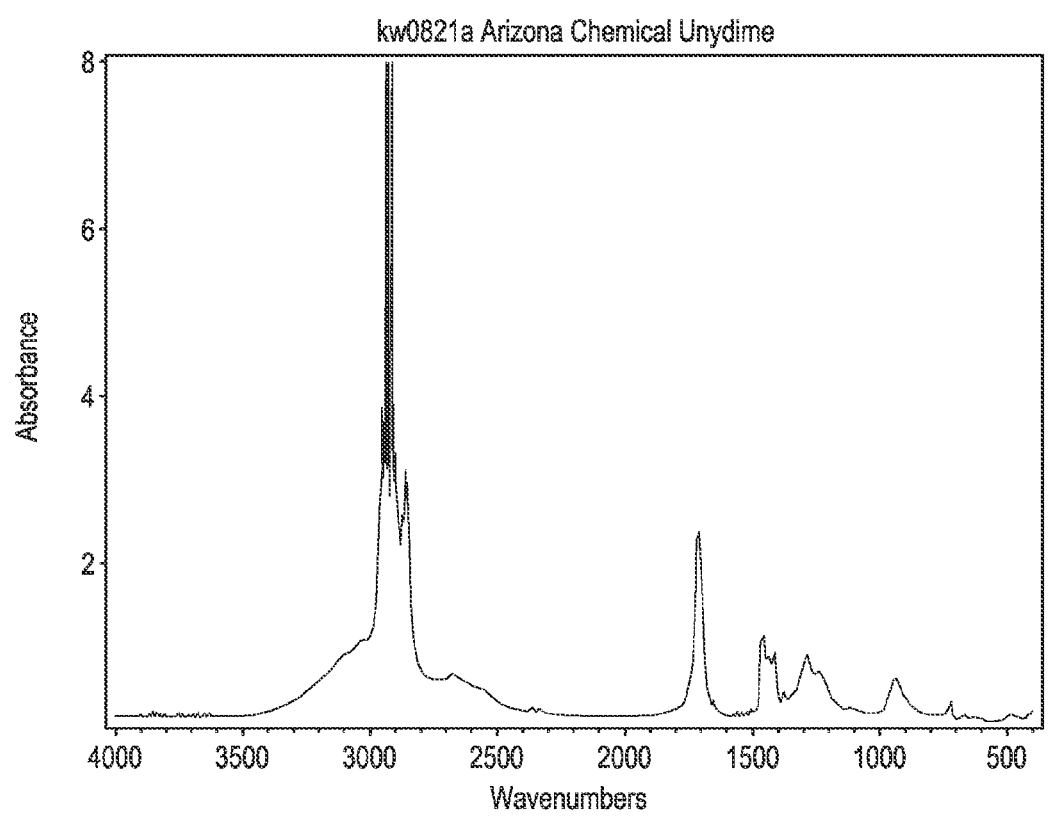
FIG. 9 is the IR spectrum of the starting material for Example 3.
Figure 10:
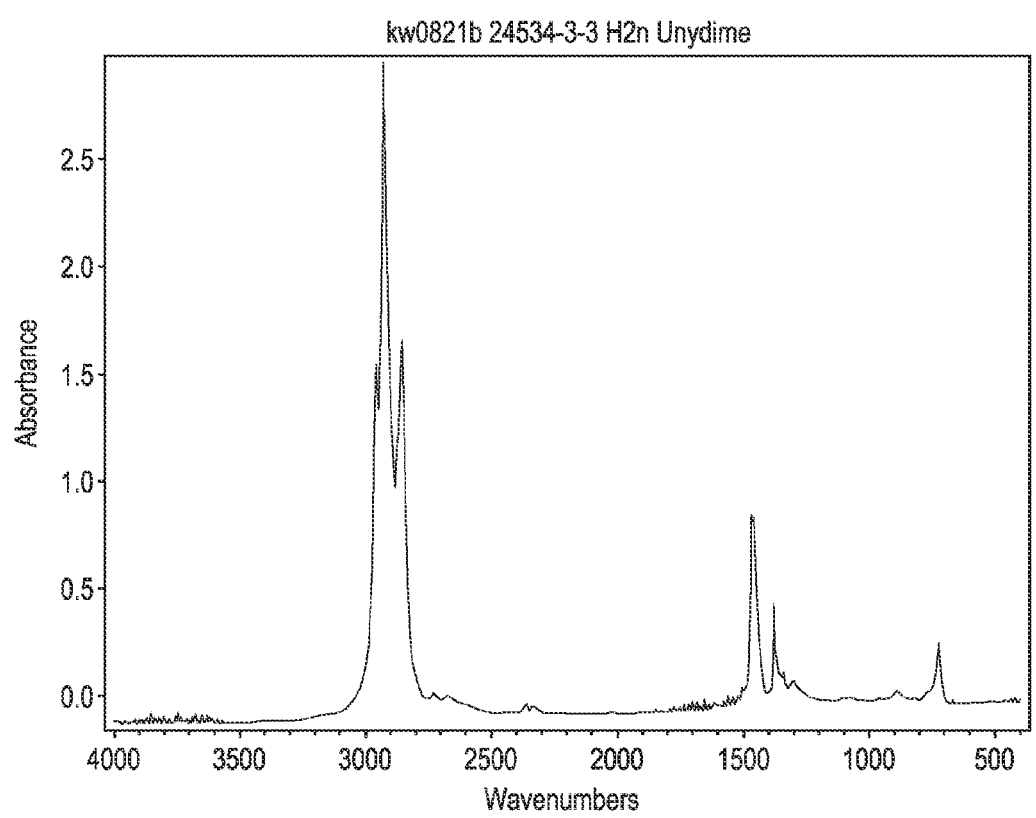
FIG. 10 is the IR spectrum of products from Example 3.

An amount of 150 grams of $C_{36}$ dimer acid (UNIDYME from Arizona Chemical) was mixed with 10.5 grams of nickel on Kieselguhr (60 wt % nickel, Aldrich catalogue #208787) in a glass liner (catalyst loading: 7 wt %). The glass liner was then inserted in a 300-cc autoclave, sealed, and heated under a flowing $H_2$ at 100 cubic centimeters per minute (cc/min) at 516 pounds per square inch gauge (psig) and 310° C. with stirring for 26.75 hours. The products were separated by filtration, yield 77% (24534-3; theoretical yield: 89% for complete hydrogenation). IR suggests that the carboxylic acid functionality has been completely removed by hydrogenation (FIGS. 9-10).

Example 4

Physical Properties of Hydrogenated Products

Viscosity and pour point for the starting materials and their corresponding hydrogenated products were measured and the results are listed in the Table 4 below.

TABLE 4

|  | dimer acid - starting material for Examples 1 and 2 | Product from Example 1 | Product from Example 2 | UNIDYME- starting material for Example 3 | Product from Example 3 | PAO6 |
|---|---|---|---|---|---|---|
| Hydrogenation catalyst |  | Nickel on Kiesel-guhr | Nickel on Kiesel-guhr |  | Nickel on Kiesel-guhr | From 1-decene |
| Wt % catalyst |  | 5.2 | 7 |  | 7 |  |
| Temperature (° C.) |  | 300 | 313 |  | 310 |  |
| H$_2$ pressure (psig) |  | 516 | 520 |  | 516 |  |
| H$_2$ flow rate (cc/minute) |  | 100 | 100 |  | 100 |  |
| Hydrogenation time (hours) |  | 24 | 24 |  | 26.75 |  |
| Pour point (° C.) |  | −42 | −45 | −21 | −48 | −57 |
| Kv 100° C. (cS) | 86.69 | 25.41 | 6.53 | 77.73 | 5.4 | 5.8 |
| Kv 40° C. (cS) | 2360.73 | 261.94 | 38.86 | 2010.12 | 30.15 | 31 |
| VI | 91 | 116 | 121 | 96 | 114 | 138 |
| Wt % Noack volatility |  |  |  |  | 5.5 | 6-9 |

The lube product from Examples 1-3 showed excellent viscometrics, good VI and very low pour points. Furthermore, the lube in Example 3 showed lower Noack volatility of 5.5% than the synthetic poly-alpha-olefin lube of 5.8 cSt. The Example 1-3 lubes are derived from natural resources and can be made by efficient processes and have lube properties comparable to synthetic lube base stocks made from PAOs.

Both the starting material (Unidyme 10) and the products in Example 3 were analyzed using mass spectroscopy. The starting material was analyzed using Field Desorption Mass Spectroscopy (FDMS) and the products by Field Ionization Mass Spectroscopy (FIMS). Major species are listed in Table 5 below. The term DBE refers to double bond equivalent, indicating the degree of unsaturation for a given hydrocarbon molecule compared with the fully saturated hydrocarbon formula $C_nH_{2n+2}$ (n is an integer). By definition, a hydrocarbon molecule containing one C=C double bond ($C_nH_{2n}$) has a DBE of one. A hydrocarbon molecule containing one naphthenic ring but otherwise saturated ($C_nH_{2n}$) has a DBE of one. Similarly, the double bond equivalent can also be defined for the acid dimer. In this case, the degree of unsaturation for a given dicarboxylic acid is compared with a fully saturated dicarboxylic acid with the formula $C_nH_{2n-2}O_4$, which only refers to the hydrocarbon fragment of the molecule and excludes the C=O bond in the carboxylic group.

TABLE 5

(Composition of feed and products for Example 3)

| Unidyme 10 | | | | Product | | | |
|---|---|---|---|---|---|---|---|
| Mass | Percent | Formula | DBE ex. C=O | Mass | Percent | Formula | DBE |
| 562 | 53 | $C_{36}H_{66}O_4$ | 2 | 476 | 37.2 | $C_{34}H_{68}$ | 1 |
| 564 | 18 | $C_{36}H_{68}O_4$ | 1 | 478 | 6.7 | $C_{34}H_{70}$ | 0 |
| 560 | 12 | $C_{36}H_{64}O_4$ | 3 | 474 | 8.2 | $C_{34}H_{66}$ | 2 |
| 558 | 7 | $C_{36}H_{62}O_4$ | 4 | 472 | 1.8 | $C_{34}H_{64}$ | 3 |
| 556 | 6 | $C_{36}H_{60}O_4$ | 5 | 470 | 9.6 | $C_{34}H_{62}$ | 4 |
| 554 | 1.5 | $C_{36}H_{58}O_4$ | 6 | 468 | 9.1 | $C_{34}H_{60}$ | 5 |
| Sub-total | 97.5 |  |  | Sub-total | 72.6 |  |  |
|  |  |  |  | 504 | 0.6 | $C_{36}H_{72}$ | 1 |
|  |  |  |  | 492 | 0.4 | $C_{35}H_{72}$ | 0 |
|  |  |  |  | 490 | 2.5 | $C_{35}H_{70}$ | 1 |
|  |  |  |  | 488 | 1.3 | $C_{35}H_{68}$ | 2 |
|  |  |  |  | 462 | 4.7 | $C_{33}H_{66}$ | 1 |
|  |  |  |  | 460 | 1.2 | $C_{33}H_{64}$ | 2 |
|  |  |  |  | 456 | 1.4 | $C_{33}H_{60}$ | 4 |
|  |  |  |  | 454 | 1.6 | $C_{33}H_{58}$ | 5 |
|  |  |  |  | 448 | 2.3 | $C_{32}H_{64}$ | 1 |
|  |  |  |  | 434 | 1.6 | $C_{31}H_{62}$ | 1 |
|  |  |  |  | 420 | 1.3 | $C_{30}H_{60}$ | 1 |
|  |  |  |  | 406 | 1.1 | $C_{29}H_{58}$ | 1 |
|  |  |  |  | 392 | 1 | $C_{28}H_{56}$ | 1 |
|  |  |  |  | 378 | 1 | $C_{27}H_{54}$ | 1 |
|  |  |  |  | Subtotal | 22 |  |  |
| Others | 2.5 |  |  | Others | 5.4 |  |  |

By comparing the major components in the starting material and the products, the difference in mass for the corresponding pairs is 86. Thus, the major reaction is hydro-decarboxylation, wherein the oxygen atoms in the starting material are removed in the form of $CO_2$ and the C=C double bond is saturated by hydrogen. Therefore both the saturation for the hydrocarbon fragment and the oxygen removal are achieved in a substantially single step.

Figure 11:
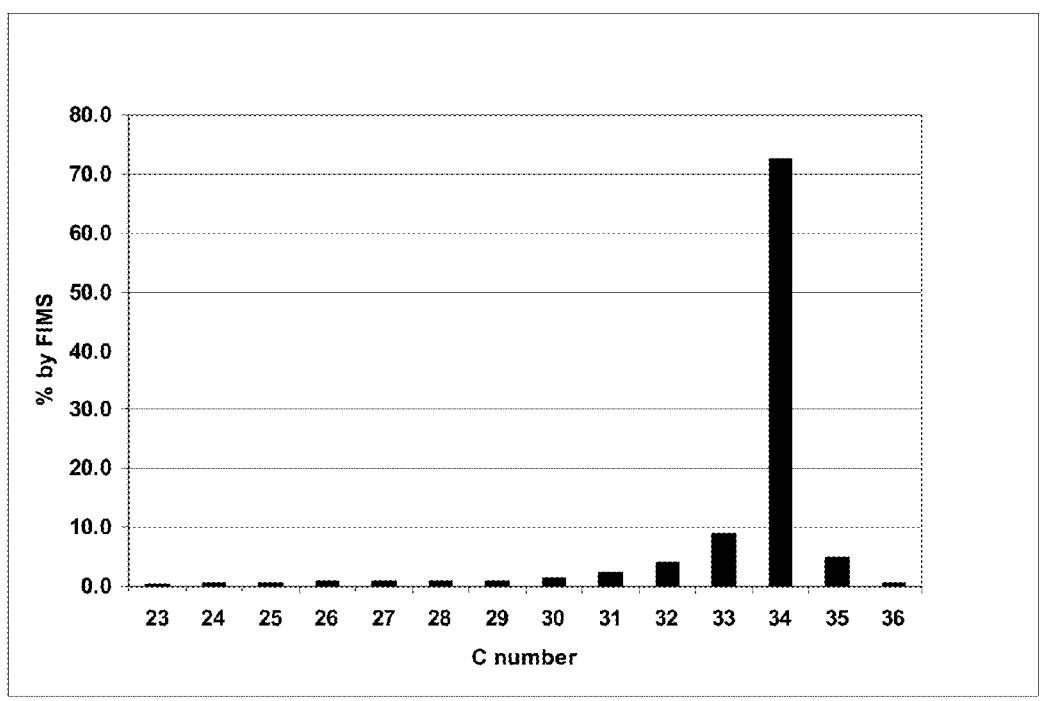
FIG. 11 is the carbon number distribution for products from Example 3.

The composition for the products in Example 3 is illustrated in FIG. 11 below. The products contain predominantly components with 34 carbon atoms. In those products, two carbons were lost during the hydrogenation step.

Example 5

Low Temperature Properties of Hydrogenated Products

Several different lube base stocks were evaluated for low temperature performance by measuring the ratio of the observed Cold Crank Simulator (CCS) viscosity to the predicted CCS viscosity (by Walther equation) for many different prior art lube base stocks and inventive base stocks. The observed Cold Crank Simulator (CCS) viscosity is measured according to ASTM D5293. The predicted CCS viscosity (by Walther equation) is estimated according to ASTM D341. The CCS viscosity was measured at −35° C., which is the most demanding temperature. When measured at a higher temperature, the CCS ratio is slightly higher. Alternative CCS test temperatures may be below −20° C., or below −25° C., or below −30° C. The lube base stocks produced from renewable biological sources were generated by hydrogenating commercially available dimer acids from various sources (see Table 7 below) using conditions of Examples 1-3. For comparison purposes, CCS Ratios were also measured for prior art Group I, II, III, and IV lube base stocks with similar KV100s to the lube base stocks produced from renewable biological sources invention of the present disclosure. The results are shown in Table 6 and Table 7 below and demonstrate the significantly lower CCS ratio measured on the inventive lube base stock samples.

The lube base stocks of the present disclosure as well as prior art non-renewable lube base stocks were also analyzed compositionally via the 2DGC technique described above in the detailed description. Table 6 includes data on comparative non-renewable prior art lube base stocks and Table 7 includes data on the inventive lube base stocks from renewable biological sources of the instant disclosure.

TABLE 6

Properties and Compositions of Non-renewable Prior Art Lube Base stocks

| | | Prior Art Base Stock Group | | | | | | |
|---|---|---|---|---|---|---|---|---|
| | | Group I | Group II | Group II | Group III | Group III | Group IV | Group IV |
| | | Product Name | | | | | | |
| | | Core 150 | EHC 45 | EHC 60 | Visom 4 | Visom 6 | PAO 5 | PAO 6 |
| | | Sample No. | | | | | | |
| | Method | 10-43744 10-68134 | 10-68134 99-7800 | 09-41845 | 06-40784 | 12-8590 | 06-38387 | 09-83412 |
| Base Stock Properties | | | | | | | | |
| KV40, cSt | D7279 (modified) or D445 | 30.7 | 22.11 | 36.155 | 16.11 | 35.21 | 24.94 | 30 |
| KV100, cSt | D7279 (modified) or D445 | 5.225 | 4.494 | 6.065 | 3.909 | 6.582 | 5.107 | 5.831 |
| Predicted CCS @ −35 C., cP | Walter Equation | 14500 | 4323 | 14820 | 1330 | 6994 | 3949 | 5464 |
| Measured CCS @ −35 C., cP | D5293 | 17910 | 5400 | 21750 | 1375 | 6965.5 | 2626 | 3610 |
| CCS Ratio | Calculation | 1.24 | 1.25 | 1.47 | 1.03 | 1.00 | 0.66 | 0.66 |
| Viscosity Index | D2270 | 100 | 116 | 113 | 142 | 144 | 138 | 141 |
| Composition | | | | | | | | |
| Paraffins, wt % | 2DGC | 31% | 37% | | 81% | | | |
| 1-Ring Naphthenes, wt % | 2DGC | 47% | 63% | | 19% | | | |
| 2-Ring Naphthenes & Aromatics, wt % | 2DGC | 22% | 0% | | 0% | | | |
| Ratio of 1R Naphthenes to Paraffins | Calculation | 1.48 | 1.67 | | 0.23 | | | |

TABLE 7

Properties and Compositions of Biological-based Renewable Inventive Lube Base stocks

| | | Inventions | | | | | | |
|---|---|---|---|---|---|---|---|---|
| | | 1 | 2 | 3 | 4 | 5 | 6 | 7 |
| | Method | Sample No. | | | | | | |
| | | 10-85289 10-112759 11-119000 | 11-44544 | 11-39265 | 11-39266 | 11-39268 | 11-39269 | 11-39267 11-97990 |
| Base Stock Properties | | | | | | | | |
| KV40, cSt | D7279 (modified) or D445 | 30.6 | 30.8 | 39.0 | 40.0 | 30.6 | 29.7 | 25.9 |
| KV100, cSt | D7279 (modified) or D445 | 5.46 | 5.47 | 6.47 | 6.55 | 5.49 | 5.39 | 4.98 |
| Predicted CCS @ −35 C., cP | Walter Equation | 10153 | 10361 | 15564 | 16885 | 9690 | 9033 | 6092 |
| Measured CCS @ −35 C., cP | D5293 | 4955 | 5020 | 8070 | 8500 | 4900 | 4660 | 3400 |
| CCS Ratio | Calculation | 0.49 | 0.48 | 0.52 | 0.50 | 0.51 | 0.52 | 0.56 |
| Viscosity Index | D2270 | 114 | 114 | 117 | 116 | 116 | 117 | 120 |
| Composition | | | | | | | | |
| Paraffins, wt % | 2DGC | 18% | 19% | 26% | 25% | | 25% | 29% |
| 1-Ring Naphthenes, wt % | 2DGC | 49% | 48% | 50% | 48% | | 57% | 61% |
| 2-Ring Naphthenes & Aromatics, wt % | 2DGC | 33% | 33% | 24% | 27% | | 18% | 9% |
| Ratio of 1R Naphthenes to Paraffins | Calculation | 2.74 | 2.54 | 1.92 | 1.97 | | 2.34 | 2.12 |
| Feedstock properties | | | | | | | | |
| Acid value (mg KOH/g) | | 197.0 | | 193.0 | 192.5 | 195.5 | 195.9 | 195.3 |
| Monomer (%) | | 0.1 | | 2.0 | 4.1 | 0.6 | 0.6 | 3.9 |
| Dimer (%) | | 99.0 | | 77.0 | 84.6 | 96.6 | 97.4 | 94.5 |
| Trimer (%) | | 0.9 | | 20.0 | 11.3 | 2.8 | 2.0 | 1.6 |
| Dimer Acid Precursor | | UNIDYME 10 | UNIDYME 10 | Pripol 1017 | Jaric D51 | Jaric D70 | Jaric D75 | Empol 1008 |
| Fatty acid starting material | | Tall Oil Fatty Acids | Tall Oil Fatty Acids | Unknown | Unknown | Unknown | Unknown | Oleic Acid |
| Vendor | | Arizona Chemical | Arizona Chemical | CRODA | JarChem | JarChem | JarChem | Cognis (BASF) |
| Reaction conditions | | | | | | | | |
| Temperature, C. | | 350 | 350 | 350 | 350 | 350 | 350 | 350 |
| Catalyst (Ni/Kieselguhr) loading, wt % | | 7 | 7 | 7 | 7 | 7 | 7 | 7 |
| Pressure, psig | | 500 | 500 | 500 | 500 | 500 | 500 | 500 |
| H2 (cc/min) | | 100 | 100 | 100 | 100 | 100 | 100 | 100 |
| Time, hour | | 24 | 24 | 24 | 24 | 24 | 24 | 24 |

Table 6 shows the properties and compositions of prior art lube base stocks from non-renewable petroleum based sources including Group I, Group II, Group III, and Group IV base stocks. The prior art base stocks have CCS ratios ranging from 0.66 (for Group IV) to 1.47 (for Group II). In contrast, the inventive renewable biological based lube base stocks shown in Table 7 have CCS ratios ranging from 0.48 to 0.56, which is a surprising and unexpected improvement over the prior art lube base stocks.

Table 6 shows the ratio of 1-ring naphthenes to paraffins of prior art lube base stocks from non-renewable petroleum based sources including Group I, Group II, Group III, and Group IV base stocks. The prior art lube base stocks have 1-ring naphthenes to paraffins ratios ranging from 0.23 (for Group III) to 1.67 (for Group II). In contrast, the inventive renewable biological based lube base stocks shown in Table 7 have 1-ring naphthenes to paraffins ratios ranging from 1.92 to 2.74, which clearly distinguish the compositions of these base stocks from the prior art base stocks. The unique chemical composition of these inventive renewable biological based lube base stocks leads to improved low temperature properties, and in particular, surprisingly lower CCS ratios.

TABLE 8

Characterization of basestocks derived from renewable and petroleum sources by $^{13}C$ NMR

| Description | Sample No. | Epsilon Carbon, mole % | Total Pendant Groups, mole % | Pendant Methyl Groups, mole % | No. Side Chains/ Molecule | Carbon number by 13C NMR | Free Carbon Index (FCI) |
|---|---|---|---|---|---|---|---|
| Invention 2 | 11-44544 | 11.63 | 4.12 | 3.47 | 0.68 | 19.67 | 2.29 |
| Invention 3 | 11-39265 | 13.13 | 4.66 | 3.91 | 0.83 | 21.31 | 2.80 |

TABLE 8-continued

Characterization of basestocks derived from renewable and petroleum sources by $^{13}$C NMR

| Description | Sample No. | Epsilon Carbon, mole % | Total Pendant Groups, mole % | Pendant Methyl Groups, mole % | No. Side Chains/ Molecule | Carbon number by 13C NMR | Free Carbon Index (FCI) |
|---|---|---|---|---|---|---|---|
| Invention 4 | 11-39266 | 12.94 | 4.60 | 3.89 | 0.85 | 21.90 | 2.83 |
| Invention 5 | 11-39268 | 13.08 | 4.44 | 3.75 | 0.80 | 21.27 | 2.78 |
| Invention 6 | 11-39269 | 12.24 | 4.49 | 3.79 | 0.80 | 21.16 | 2.59 |
| Invention 7 | 11-39267 | 13.34 | 5.00 | 4.33 | 0.95 | 22.03 | 2.94 |
| Grp I | 11-48508 | 12.04 | 6.98 | 5.25 | 2.04 | 38.80 | 4.67 |
| Grp III | 99-7800 | 13.18 | 8.98 | 7.04 | 2.54 | 36.06 | 4.75 |
| Grp III | 06-40784 | 16.66 | 11.07 | 9.00 | 3.05 | 33.89 | 5.65 |

Table 8 shows the $^{13}$C NMR results for the inventive renewable biological based lube base stocks and conventional non-renewable Group I, II, and III lube base stocks. The inventive renewable biological based lube base stocks have a FCI of less than 3.0; while those of conventional non-renewable lube base stocks have FCI greater than 4.0.

PCT/EP Clauses:

1. A lube base stock produced from a renewable biological source comprising from 10 to 35 wt. % paraffins, 40 to 70 wt. % 1-ring naphthenes, and 0 to 40 wt. % combined 2-ring naphthenes and aromatics, wherein the ratio of 1-ring naphthenes to paraffins is from 1.8 to 5.0, and wherein the Viscosity Index of the lube base stock is from 100 to 160.

2. The lube base stock of clause 1, wherein the paraffins range from 15 to 30 wt. %.

3. The lube base stock of clauses 1-2, wherein the 1-ring naphthenes range from 45 to 65 wt. %.

4. The lube base stock of clauses 1-3, wherein the combined 2-ring naphthenes and aromatics range from 5 to 35 wt. %.

5. The lube base stock of clauses 1-4, wherein the ratio of 1-ring naphthene to paraffins is from 1.9 to 4.0.

6. The lube base stock of clauses 1-5, wherein the lube base stock yields a CCS ratio (Cold Crank Simulator (CCS) viscosity to the predicted CCS viscosity by Walther equation) less than or equal to 0.85 at −35° C.

7. A lube base stock produced from a renewable biological source having a $^{14}$C level ranging from 2 to 101% of the modern day $^{14}$C level in the atmosphere, and wherein the lube base stock yields a CCS ratio (Cold Crank Simulator (CCS) viscosity to the predicted CCS viscosity by Walther equation) of less than or equal to 0.85 at −35° C.

8. The lube base stock of clauses 1-7, wherein the lube base stock yields a CCS ratio (Cold Crank Simulator (CCS) viscosity to the predicted CCS viscosity by Walther equation) less than or equal to 0.60 at −35° C.

9. The lube base stock of clauses 1-8 having a Viscosity Index from 110 to 140.

10. The lube base stock of clause 1-9 including less than 3 wt. % oxygenates.

11. The lube base stock of clauses 1-10 having consecutive carbon numbers ranging from $C_{20}$ to $C_{60}$ with at least 40 wt % at a single carbon number selected from the group consisting of $C_{30}$, $C_{31}$, $C_{32}$, $C_{33}$, $C_{34}$, $C_{35}$, $C_{36}$, $C_{37}$, $C_{38}$, $C_{39}$, and $C_{40}$.

12. The lube base stock of clauses 1-11 having consecutive carbon numbers ranging from $C_{20}$ to $C_{60}$ with at least 40 wt % falling within a carbon number range from $C_{30}$ to $C_{40}$.

13. The lube base stock of clauses 1-12, wherein the renewable biological source includes animal oils, animal fats, animal waxes, vegetable oils, vegetable fats, vegetable waxes, fish oils, fish fats, fish waxes, and algae sources.

14. The lube base stock of clauses 1-13, wherein the lube base stock has a kinematic viscosity at 100° C. ranging from 1 to 100 cSt.

15. The lube base stock of clauses 1-14, wherein the lube base stock has a kinematic viscosity at 100° C. ranging from 2 to 20 cSt.

16. The lube base stock of clauses 1-15 having a sulfur content less than 300 ppm.

17. The lube base stock of clauses 1-16 having a nitrogen content less than 100 ppm.

18. The lube base stock of clauses 1-17 having an olefin content of less than 3 wt. % by proton NMR.

19. The lube base stock of clauses 1-18 having a Noack volatility of less than 10 wt. % for a viscosity of at least 4 cSt.

20. The lube base stock of clauses 1-19 having a Noack volatility of less than $(-79.8*\log_{10}(\log_{10}(CCS\ @-35°\ C.))+54.26)$ and greater than $(-120*\log_{10}(\log_{10}(CCS\ @-35°\ C.))+73.71)$.

21. The lube base stock of clauses 1-20 having a pour point less than −15° C.

22. The lube base stock of clauses 1-21 having a Free Carbon Index of less than 3.0

Applicants have attempted to disclose all embodiments and applications of the disclosed subject matter that could be reasonably foreseen. However, there may be unforeseeable, insubstantial modifications that remain as equivalents. While the present disclosure has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this disclosure and for all jurisdictions in which such incorporation is permitted.

When numerical lower limits and numerical upper limits are listed herein, ranges from any lower limit to any upper limit are contemplated.

What is claimed is:

1. A lube base stock produced from a renewable biological source comprising from 10 to 35 wt. % paraffins, 40 to 70 wt. % 1-ring naphthenes, and 0 to 40 wt.% combined 2-ring naphthenes and aromatics, wherein the Free Carbon Index is less than 3.0,
wherein pendant methyl groups mole % is less than or equal to 4.33,
wherein the ratio of 1-ring naphthenes to paraffins is from 1.8 to 5.0, and
wherein the Viscosity Index of the lube base stock is from 100 to 160.

2. The lube base stock of claim 1, wherein the paraffins range from 15 to 30 wt. %.

3. The lube base stock of claim 1, wherein the 1-ring naphthenes range from 45 to 65 wt. %.

4. The lube base stock of claim 1, wherein the combined 2-ring naphthenes and aromatics range from 5 to 35 wt. %.

5. The lube base stock of claim 1, wherein the ratio of 1-ring naphthene to paraffins is from 1.9 to 4.0.

6. The lube base stock of claim 1, wherein the Viscosity Index of the lube base stock is from 110 to 140.

7. The lube base stock of claim 1, wherein the lube base stock yields a CCS ratio (Cold Crank Simulator (CCS) viscosity to the predicted CCS viscosity by Walther equation) less than or equal to 0.85 at −35° C.

8. The lube base stock of claim 1, wherein the lube base stock yields a CCS ratio (Cold Crank Simulator (CCS) viscosity to the predicted CCS viscosity by Walther equation) less than or equal to 0.70 at −35° C.

9. The lube base stock of claim 1, wherein the lube base stock yields a CCS ratio (Cold Crank Simulator (CCS) viscosity to the predicted CCS viscosity by Walther equation) less than or equal to 0.60 at −35° C.

10. The lube base stock of claim 1 including less than 3 wt. % oxygenates.

11. The lube base stock of claim 1 including substantially no oxygenates.

12. The lube base stock of claim 1 having consecutive carbon numbers ranging from $C_{20}$ to $C_{60}$ with at least 40 wt % at a single carbon number selected from the group consisting of $C_{30}$, $C_{31}$, $C_{32}$, $C_{33}$, $C_{34}$, $C_{35}$, $C_{36}$, $C_{37}$, $C_{38}$, $C_{39}$, and $C_{40}$.

13. The lube base stock of claim 1 having consecutive carbon numbers ranging from $C_{30}$ to $C_{50}$ with at least 60 wt % at a single carbon number selected from the group consisting of $C_{30}$, $C_{31}$, $C_{32}$, $C_{33}$, $C_{34}$, $C_{35}$, $C_{36}$, $C_{37}$, $C_{38}$, $C_{39}$, and $C_{40}$.

14. The lube base stock of claim 1 having consecutive carbon numbers ranging from $C_{20}$ to $C_{60}$ with at least 40 wt % falling within a carbon number range from $C_{30}$ to $C_{40}$.

15. The lube base stock of claim 1 having consecutive carbon numbers ranging from $C_{20}$ to $C_{60}$ with at least 60 wt % falling within a carbon number range from $C_{30}$ to $C_{40}$.

16. The lube base stock of claim 1, wherein the renewable biological source includes animal oils, animal fats, animal waxes, vegetable oils, vegetable fats, vegetable waxes, fish oils, fish fats, fish waxes, and algae sources.

17. The lube base stock of claim 1, wherein the lube base stock has a kinematic viscosity at 100° C. ranging from 1 to 100 cSt.

18. The lube base stock of claim 1, wherein the lube base stock has a kinematic viscosity at 100° C. ranging from 2 to 20 cSt.

19. The lube base stock of claim 1 having a sulfur content less than 300 ppm.

20. The lube base stock of claim 1 having a nitrogen content less than 100 ppm.

21. The lube base stock of claim 1 having an olefin content of less than 3 wt. % by proton NMR.

22. The lube base stock of claim 1 having substantially no olefins by proton NMR.

23. The lube base stock of claim 1 having a Noack volatility of less than 10 wt. % for a viscosity of at least 4 cSt.

24. The lube base stock of claim 1 having a Noack volatility of less than $(-79.8 * \log_{10}(\log_{10}$ (CCS @−35° C.)) +54.26) and greater than $(-120 * \log_{10}(\log_{10}$(CCS @−35° C.)) +73.71).

25. The lube base stock of claim 1 having a pour point less than −15° C.

26. The lube base stock of claim 1 having a pour point less than −30° C.

27. The lube base stock of claim 1 having a pour point less than −45° C.

28. A lube base stock produced from a renewable biological source having a $^{14}C$ level ranging from 2 to 101% of the modern day $^{14}C$ level in the atmosphere, and wherein the lube base stock yields a CCS ratio (Cold Crank Simulator (CCS) viscosity to the predicted CCS viscosity by Walther equation) of less than or equal to 0.85 at −35° C., and wherein the lube base stock has a Free Carbon Index of less than 3.0 and pendant methyl groups mole % of less than or equal to 4.33.

29. The lube base stock of claim 28 having a $^{14}C$ level ranging from 50 to 101% of the modern day $^{14}C$ level in the atmosphere.

30. The lube base stock of claim 28 having a $^{14}C$ level ranging from 80 to 101% of the modern day $^{14}C$ level in the atmosphere.

31. The lube base stock of claim 28, wherein the Viscosity Index of the lube base stock is from 100 to 160.

32. The lube base stock of claim 28, wherein the lube base stock yields a CCS ratio (Cold Crank Simulator (CCS) viscosity to the predicted CCS viscosity by Walther equation) less than or equal to 0.70 at −35° C.

33. The lube base stock of claim 28, wherein the lube base stock yields a CCS ratio (Cold Crank Simulator (CCS) viscosity to the predicted CCS viscosity by Walther equation) less than or equal to 0.60 at −35° C.

34. The lube base stock of claim 28, wherein the renewable biological source includes animal oils, animal fats, animal waxes, vegetable oils, vegetable fats, vegetable waxes, fish oils, fish fats, fish waxes, and algae sources.

35. The lube base stock of claim 28, wherein the lube base stock has a kinematic viscosity at 100° C. ranging from 1 to 100 cSt.

36. The lube base stock of claim 28, wherein the lube base stock has a kinematic viscosity at 100° C. ranging from 2 to 20 cSt.

37. The lube base stock of claim 28 having a Noack volatility of less than 10 wt. % for a viscosity of at least 4 cSt.

38. The lube base stock of claim 28 having a Noack volatility of less than $(-79.8 * \log_{10}(\log_{10}$(CCS viscosity @−35° C.)) +54.26) and greater than $(-120 * \log_{10}(\log_{10}$ (CCS viscosity @−35° C.)) +73.71).

39. The lube base stock of claim 28 having a pour point less than −15° C.

40. The lube base stock of claim 28 having a pour point less than −30° C.

41. The lube base stock of claim 28 having a pour point less than −45° C.

* * * * *